(12) United States Patent
Nishikawa

(10) Patent No.: US 8,860,801 B2
(45) Date of Patent: Oct. 14, 2014

(54) ELECTRONIC DEVICE AND IMAGE PICKUP APPARATUS

(75) Inventor: Tokuhiro Nishikawa, Tokyo (JP)

(73) Assignee: Sony Corporation, Tokyo (JP)

(*) Notice: Subject to any disclaimer, the term of this patent is extended or adjusted under 35 U.S.C. 154(b) by 38 days.

(21) Appl. No.: 13/587,427

(22) Filed: Aug. 16, 2012

(65) Prior Publication Data

US 2013/0063647 A1    Mar. 14, 2013

(30) Foreign Application Priority Data

Sep. 8, 2011   (JP) .................................. 2011-196386

(51) Int. Cl.
*H04N 5/00* (2011.01)
*H04N 5/225* (2006.01)
*G01C 21/16* (2006.01)
*G01C 17/28* (2006.01)
*H04N 5/232* (2006.01)

(52) U.S. Cl.
CPC .............. *G01C 21/16* (2013.01); *H04N 5/225* (2013.01); *G01C 17/28* (2013.01); *H04N 5/23216* (2013.01)

USPC ........................................... 348/116; 348/113

(58) Field of Classification Search
USPC ..................... 348/208.12, 113, 116
See application file for complete search history.

(56) References Cited

U.S. PATENT DOCUMENTS

2003/0058347 A1* 3/2003 Lee ............................ 348/211.4
2012/0120296 A1* 5/2012 Roberts et al. ........... 348/333.12

FOREIGN PATENT DOCUMENTS

| JP | 8-114454 | 5/1996 |
| JP | 11-344339 | 12/1999 |
| JP | 2008-281494 | 11/2008 |

* cited by examiner

*Primary Examiner* — Mekonnen Dagnew
(74) *Attorney, Agent, or Firm* — Sony Corporation

(57) ABSTRACT

There is provided an electronic device including a geomagnetism detection part acquiring magnetic direction data corresponding to geomagnetism every predetermined period of time, a change amount calculation part calculating a change amount of the magnetic direction data, a storage part storing the magnetic direction data, an angular velocity integration part calculating angle data obtained by integration of angular velocity obtained by an angular velocity detection part, and a direction output part.

11 Claims, 16 Drawing Sheets

A

B

A

B

A

B

ELECTRONIC DEVICE AND IMAGE PICKUP APPARATUS

BACKGROUND

The present disclosure relates to an electronic device and an image pickup apparatus applied to a mobile electronic device such as a digital camera and a mobile telephone.

In related art, a mobile electronic device such as a digital camera and a mobile telephone has achieved functions of presenting a front-facing direction of a device to a user of the device and providing convenience or entertainment to the user by using the direction. For example, a compass function of displaying a current direction of an image pickup apparatus on a display screen becomes popularized. Further, a function becomes popularized of storing data of a photographer position and a photographing direction together with image data of a picture when the picture is shot, and displaying the picture on a map with direction data when the picture is viewed. In order to achieve those functions, an electromagnetic compass appropriate for embedding is often used because of a small size.

However, the electromagnetic compass is affected by magnetic disturbance or the like thereby including a fluctuation in a detected direction because the electromagnetic compass detects a magnetic direction by using a magnetic sensor. In order to remove the fluctuation, a method using a low-pass filter or averaging processing for cancelling a high-frequency component may be used. However, there is a problem that the low-pass filter and averaging processing deteriorates response. Especially, in comparison with a direction sensor mounted on large equipment such as a ship and a vehicle, deterioration in response often becomes more of a problem for the mobile electronic device due to high-speed change in direction in response to user action.

Further, the mobile electronic device has various factors inside to disturb magnetism. Hereinafter, such disturbance may be referred to as magnetic disturbance. For example, the magnetic disturbance may occur due to movement of various mechanism embedded in the device such as a motor driven in zooming, charge and discharge of a flash, shutter mechanism and autofocus mechanism. For this reason, it is necessary for the image pickup apparatus so as not to be affected by the magnetic disturbance occurring in the device when the electromagnetic compass is embedded in the image pickup apparatus.

In order to compensate for shortcomings of the electromagnetic compass, it has been already proposed to use the electromagnetic compass in combination with a highly-responsive angular velocity sensor as typified by a gyro sensor. The magnetic direction detected by the electromagnetic compass has the characteristics such that though response is low and fluctuation occurs, detection accuracy is high in the long term (when processed by the low-pass filter or averaging). On the other hand, an integration direction obtained by integration of an output from the angular velocity sensor has the characteristics such that though response is high in the short term, detection accuracy is low in long term due to occurrence of a drift phenomenon in which an error is added.

In Japanese Patent Laid-Open No. 11-344339, a highly accurate electromagnetic compass having high response is achieved by processing a difference between the magnetic direction and the integration direction by using a low-pass filter, adding the integration direction to the processed resultant and outputting the addition resultant In Japanese Patent Laid-Open No. 2008-281494, a wearable position detecting mobile terminal device is disclosed in which a geomagnetic vector is acquired from a magnetic sensor at predetermined time intervals and calculates geomagnetic amount of change that is an amount of change in a magnitude of the geomagnetic vector in the predetermined time. In the case where the calculated geomagnetic amount of a change is within a range of a predetermined threshold value, a direction of a wearing person is determined based on the geomagnetic vector acquired by the magnetic sensor. In the case where the calculated geomagnetic amount of change is outside a range of the predetermined threshold value, the direction of the wearing person is determined by employing the latest direction determined based on the latest geomagnetic vector indicating the geomagnetic amount of change within the range of the predetermined threshold value. Alternatively, in this case, a rotation amount added direction obtained by adding a rotation amount acquired by a gyro sensor to the latest direction is determined as the direction of the wearing person. In Japanese Patent Laid-Open No. 8-114454, by using a magnetic direction indicator and a rotation angular velocity sensor, a relative rotation angle is obtained based on angular velocity data detected by the rotation angular velocity sensor. Further, standard deviation is obtained by performing statistical processing on azimuth angle data of magnetic direction indicator and in the case where the standard deviation is relatively large, it is determined that magnetic disturbance is occurring and the relative rotation angle is added to the azimuth angle.

SUMMARY

In the above patent documents, it is disclosed that accuracy of direction detection is improved by using the magnetic sensor and the angular velocity sensor. However, no measures has been taken for the magnetic disturbance occurring inside the electronic device. When incorporating the direction detection technique using the magnetic sensor in the mobile electronic device, for example, it is necessary to consider various kinds of magnetic disturbance occurring inside the mobile electronic device.

For example, a technique in Japanese Patent Laid-Open No. 11-344339 is targeted for direction detection of the ship or the vehicle. In comparison with the mobile electronic device, the ship and the vehicle exist in an environment with less magnetic disturbance. In Japanese Patent Laid-Open No. 11-344339, by considering a magnetic direction passed through a low-pass filter as a correct direction in the long term, integration direction by the angular velocity sensor is added. However, though a short-period fluctuation included in an output of the magnetic sensor can be cancelled by the low-pass filter, output disturbance of the magnetic sensor in the case where the magnetic disturbance occurs inside the device has a small frequency and passes the low-pass filter, there has been a problem that it is difficult to calculate a correct direction as the reference.

Also in Japanese Patent Laid-Open No. 2008-281494, since there is disclosed a terminal device dedicated for position detection, measures are not taken for the problem that a magnetic condition of inside the device is disturbed temporarily due to a user operation or an internal movement. Further, in the technique disclosed in Japanese Patent Laid-Open No. 2008-281494, it is determined whether the gyro sensor is used by determining only an output change amount of the magnetic sensor by using a threshold value, measures are taken for partially solving response delay of the magnetic sensor. A method disclosed in Japanese Patent Laid-Open No. 8-114454 is the one for improving accuracy in the case where the geomagnetic disturbance occurs due to a magnetic field caused by an influence of an artificial construction while the vehicle is moving, so that measures for the magnetic disturbance inside the device have not been taken.

Accordingly, the present disclosure is to provide an electronic device and an image pickup apparatus capable of inhibiting deterioration in accuracy caused by the magnetic disturbance occurring inside the device.

According to an embodiment of the present disclosure, there is provided an electronic device which includes a geomagnetism detection part acquiring magnetic direction data corresponding to geomagnetism every predetermined period of time, a change amount calculation part calculating a change amount of the magnetic direction data, a storage part storing the magnetic direction data, an angular velocity integration part calculating angle data obtained by integration of angular velocity obtained by an angular velocity detection part, and a direction output part employing, in the case where the magnetic direction data and the angular velocity are within a range of a threshold value, the magnetic direction data as output direction data, using, in the case where either one of the change amount or the angular velocity is outside the range of the threshold value, the angle calculated by the angular velocity integration part by setting a time point when exceeding the threshold value as a base point in time of zero, and employing, as an output direction, a value in which the angle is added to a latest geomagnetism data stored in the case where the change amount and the angular velocity are within the threshold value.

The present disclosure can perform direction detection having high response and noise resistance when combined with the magnetic direction detected by the geomagnetic sensor or the like and the integration direction detected by the angular velocity sensor. In the present disclosure, by constantly monitoring the output value of each sensor and an operational state of the device, a magnetic direction priority mode and an integration direction priority mode are dynamically switched. That is, let the magnetic direction when stabilized be a true direction and in the case where the mode enters the integration direction priority mode, the magnetic direction at the time of entering the integration direction priority mode is stored in a register as a reference value and the direction data offset from the reference direction related to the integration direction is output.

DETAILED DESCRIPTION OF THE EMBODIMENT(S)

Although the embodiments described below are specific examples suitable for the present disclosure, and technically preferable various limitations are given, the scope of the disclosure is not limited to the embodiments unless a statement that limits the present disclosure is provided in the following description.

"An Example of Image Pickup Apparatus"

Figure 1:
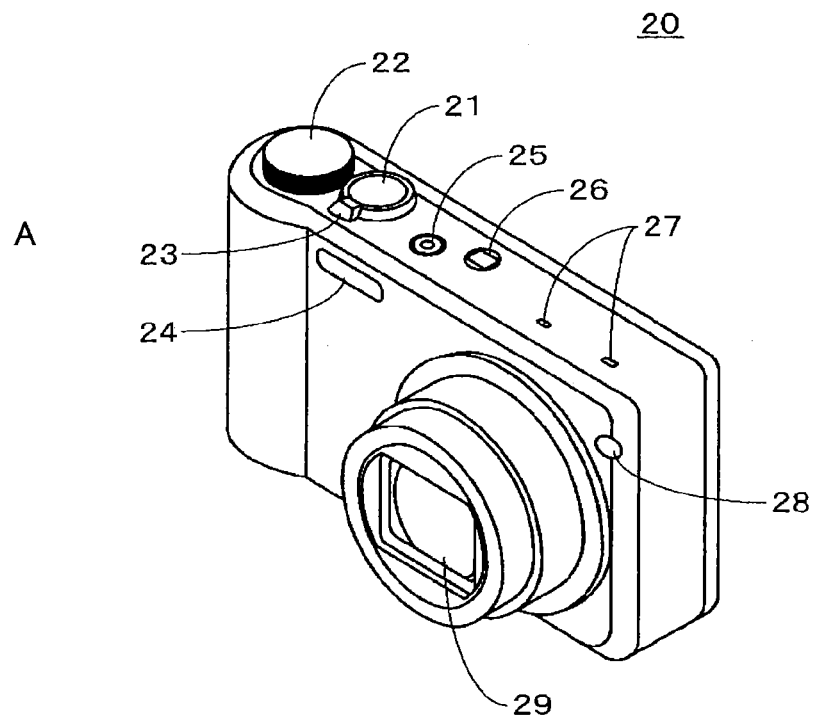
FIGS. 1A and 1B are perspective views illustrating an exterior appearance of an image pickup apparatus according to an embodiment of the present disclosure.
Figure 1:
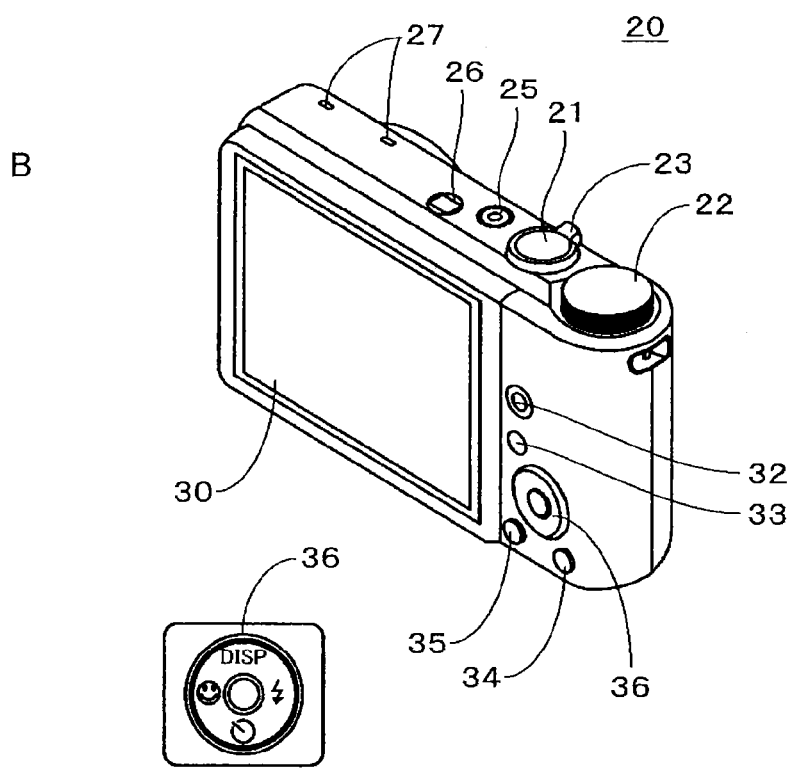

An embodiment of the present disclosure will be described. An example of an image pickup apparatus to which the present disclosure is applicable will be described with reference to FIG. 1. FIG. 1A illustrates a front face of an image pickup apparatus 20 and FIG. 1B illustrates a back face of the image pickup apparatus 20. Reference numeral 21 denotes a shatter button, reference numeral 22 denotes a mode dial, reference numeral 23 denotes a zoom lever and reference numeral 24 denotes a flash. Reference numeral 25 denotes a power button, reference numeral 26 denotes a continuous shooting button, reference numeral 27 denotes a microphone, reference numeral 28 denotes a self-timer button and reference numeral 29 denotes a lens. The mode dial 22 is turned for selection of a desired function to operate. For example, functions such as an automatic shooting mode capable of shooting by automatic settings, a manual exposure shooting, a programmed automatic shooting mode and a video shooting mode are switched from one to another.

On the back face of the image pickup apparatus, an LCD (Liquid Crystal Display) 30, a strap attaching part 31, a video button 32, a play button 33, a deletion button 34, a menu button 35 and a control button 36 are provided. The control button 36 has an enter button at the center position and select buttons on the right, left, top and bottom as illustrated in a magnified manner. For example, when the select button on the top is pressed, display for screen display setting is displayed on a screen of the LCD 30, and when the select button on the observer's right is pressed, display for flash setting is displayed on the screen of the LCD 30. Note that, the LCD 30 has a function of EVF (Electric View Finder) and as a display part having the EVF function may be a display device using an organic EL (Electro-Luminescence) other than an LCD. Further, the image pickup apparatus illustrated in FIG. 1 is an example and the present disclosure can be applied to another configuration example such as a shooting function of a smartphone.

Figure 2:
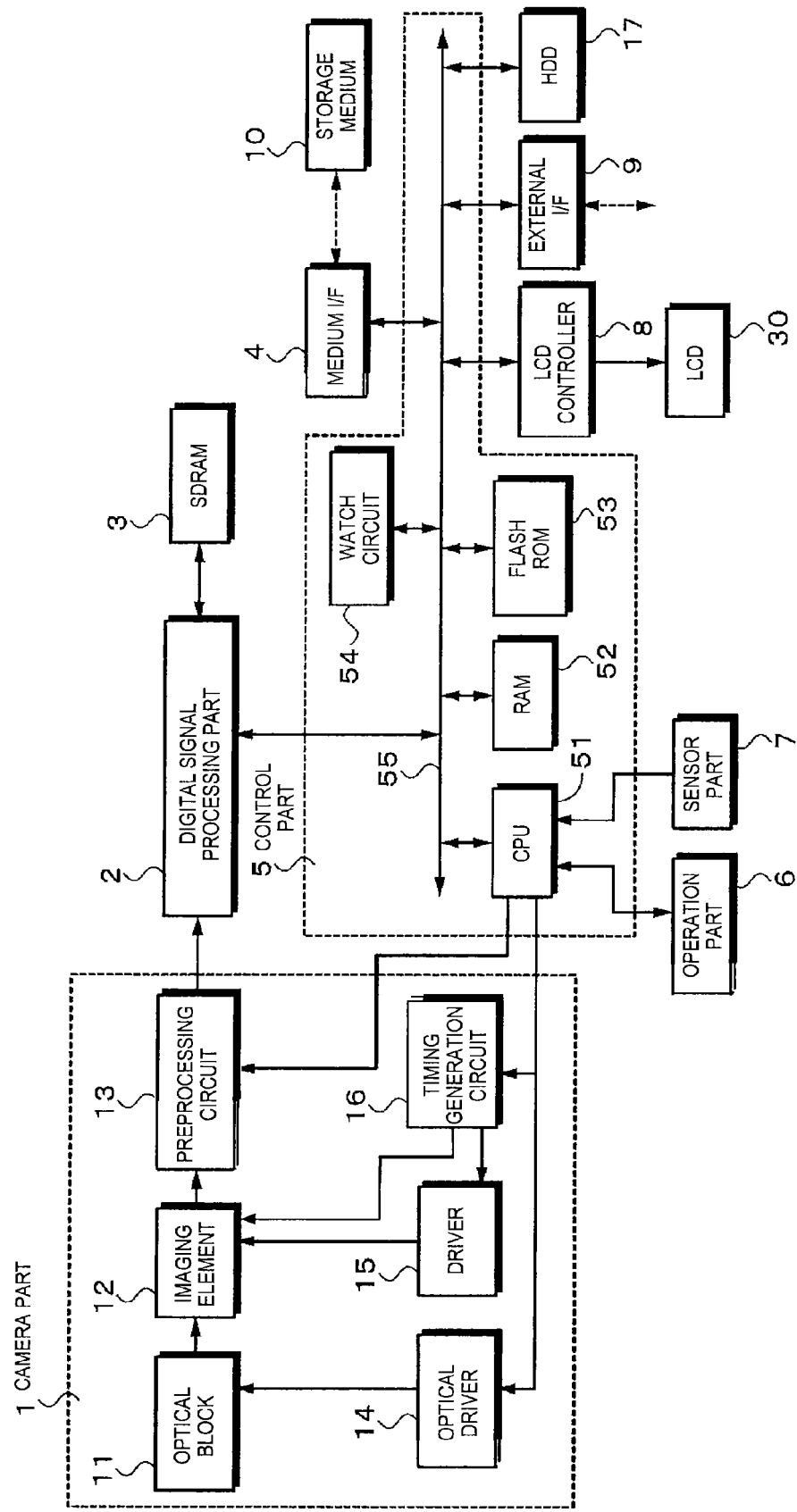
FIG. 2 is a block diagram illustrating an embodiment of the image pickup apparatus according to an embodiment of the present disclosure.

The image pickup apparatus includes, as illustrated in FIG. 2, a camera part 1, a digital signal processing part 2, an SDRAM (Synchronous Dynamic Random Access Memory) 3, a medium interface (hereinafter referred to as medium I/F) 4, a control part 5, an operation part 6 and a sensor part 7. Further the image pickup apparatus includes an LCD controller 8, an LCD 30 and external interface (hereinafter referred to as external I/F) 9. A storage medium 10 is removable to and from the medium I/F 4. Further, the image pickup apparatus includes a hard disk drive 17 that is high-capacity storage medium for accumulating image files.

The storage medium 10 is a so-called memory card using a semiconductor memory, for example. As the storage medium 10, a hard disk device, an optical storage medium such as a recordable DVD (Digital Versatile Disc) and a recordable CD (Compact Disc), a magnetic disk and the like may be used other than the memory card.

The camera part 1 includes an optical block 11, an imaging element 12 such as CCD (Charge Coupled Device) and CMOS (Complementary Metal Oxide Semiconductor), a preprocessing circuit 13, an optical block driver 14, a CCD driver 15 and a timing generation circuit 16. Here, the optical block 11 includes a lens, focus mechanism, shutter mechanism, a diaphragm (iris) mechanism and the like.

The control part 5 is a microcomputer in which a CPU (Central Processing Unit) 51, RAM (Random Access Memory) 52, a flash ROM (Read Only memory) 53 and a watch circuit 54 are connected through a system bus 55, and controls each part of the image pickup apparatus of the embodiment. The RAM 52 is mainly used as a work area such as to temporarily store resultants obtained in the process of performing processing. In the flash ROM 53, various programs performed by the CPU 51, data necessary for processing and the like are stored. The watch circuit 54 has functions of providing the current date, the current day of the week, the current time, shooting date and time, and the like, and attaching the date-and-time information such as the shooting date and time to a shooting image file.

In shooting, the optical block driver 14 creates a drive signal for driving the optical block 11 in response to control from the control part 5, and supplies the drive signal to the optical block 11 to drive the optical block 11. In the optical block 11, the focus mechanism, the shutter mechanism and the diaphragm mechanism are controlled in response to the drive signal from the driver 14, and a subject image is captured and the captured subject image is supplied to the imaging element 12. Further, the lens device of the optical block 11 is exchangeable. For example, the lens device includes a microcomputer inside and information such as a type of the lens device and a current focal point distance is transmitted to the CPU 51.

The imaging element 12 photoelectrically converts the subject image from the optical block 11 and outputs the resultant. The imaging element 12 is driven in response to the drive signal from the imaging element driver 15, the subject image is captured and the captured subject image is supplied to the preprocessing circuit 13 as an electrical signal based on a timing signal from the timing generation circuit 16 controlled by the control part 5

Note that, the timing generation circuit 16 forms a timing signal providing predetermined timing in response to control from the control part 5. The imaging element driver 15 forms a drive signal supplied to the imaging element 12 based on the timing signal from the timing generation circuit 16.

The preprocessing circuit 13 performs CDS (Correlated Double Sampling) processing on the supplied shot image signal to improve an S/N ratio, performs AGC (Automatic Gain Control) processing to control a gain and forms image data of a digital signal by performing A/D (Analog/Digital) conversion.

The digital shot image data from the preprocessing circuit 13 is supplied to the digital signal processing part 2. The digital signal processing part 2 performs camera signal processing such as AF (Auto Focus), AE (Auto Exposure) and AWB (Auto White Balance) on the shot image data. Image data on which the camera signal processing is performed is data compressed by a predetermined compression method and supplied to the loaded storage medium 10 and/or the hard disk drive 17 through the system bus 55 and the medium I/F 4 to be stored in the storage medium 10 and/or the hard disk drive 17 as an image file in conformity to the DCF (Design rule for Camera File system) standard, for example.

From among the image data stored in the storage medium 10, the desired image data is read out from the storage medium 10 via the medium I/F 4 in response to an operation input by a user accepted through the operation part 6 and supplied to the digital signal processing part 2. The operation part 6 includes various buttons such as a shutter release button, levers, dials and the like. The LCD 30 may be a touch panel allowing a user to perform an input operation by pressing a screen by using a finger or a pointing device.

The digital signal processing part 2 performs decompression processing (elongation processing) on the compressed image data read out from the storage medium 10 and supplied through the medium I/F 4, and supplies the decompressed image data to the LCD controller 8 through the system bus 55. The LCD controller 8 forms a display image signal to be supplied to the LCD 30 from the image data and supplies the display image signal to the LCD 30. Because of this, an image corresponding to the image data stored in the storage medium 10 is displayed on a screen of the LCD 30. Further, a text such as a menu and graphics is allowed to be displayed on the screen of the LCD 30 by control of the control part 5 and the LCD controller 8. Note that, a displaying form of the image conforms to a display processing program stored in the ROM.

Further, the image pickup apparatus includes an external I/F 9. An external personal computer, for example, can be connected through the external I/F 9, and when image data is supplied from the personal computer, the supplied image data can be stored in the storage medium loaded on the apparatus, and the image data stored in the storage medium loaded on the apparatus can be supplied to the external personal computer.

Still further, by connecting a communication module to the external I/F 9, the image pickup apparatus can be connected to a network such as the Internet, for example, and can acquire various pieces of image data or other information through the network to store the image data and the other information in the storage medium loaded on the apparatus, or data stored on the storage medium loaded on the apparatus can be transmitted to a desired destination through the network.

Further, information such as image data acquired from the external personal computer of over the network and stored in the storage medium can be read out and reproduced to be displayed on the LCD 30.

Note that, the external I/F 9 can be provided as the wired interface such as IEEE (Institute of Electrical and Electronics Engineers) 1394 and USB (Universal Serial Bus), and also can be provided as the wireless interface by light or electrical waves. That is, the external I/F 9 may be either the wired interface or the wireless interface. The apparatus can be connected with an external computer device not shown, for example, and image data can be supplied from the computer device through the external I/F 9 and the image data can be stored in the storage medium 10 and/or the hard disk drive 17. The image data stored in the storage medium 10 and/or the hard disk drive 17 can be supplied to the external computer device and the like.

The subject image (still image and moving image) can be shot by the above-described image pickup apparatus and stored in the loaded storage medium 10 and/or the hard disk drive 17. Further, the stored image data can be read out form the storage medium 10 and/or the hard disk drive 17, and the image can be displayed and voluntarily viewed and edited. For the purpose of image data management, an indexed file is stored in a particular area of the storage medium 10 and/or the hard disk drive 17.

Here, an operation of the above-described image pickup apparatus will be roughly described. Light is received by the imaging element 12, and the photoelectrically converted signal is supplied to the preprocessing circuit 13 and converted to a digital signal by performance of the CDS processing and the AGC processing, and supplied to the digital signal processing part 2. In the digital signal processing part 2, image quality correction is performed on the image data and supplied to the control part 5 as the image data of a camera-through image. The image data input from the control part 5 is supplied to the LCD controller 8 and the camera-through image is displayed on the LCD 30.

A user can adjust an angle of view while watching the camera-through image displayed on the LCD 30. In the present disclosure, an imaginary object is displayed by using AR (Augmented Reality) on the screen of the LCD 30 on which the subject is displayed in shooting as will be described below. By displaying the imaginary object, guidance for a user about shooting a recommended picture can be achieved.

When a shutter button of the operation part 6 is pressed, the CPU 51 outputs a control signal to the camera part 1 to make the shutter of the optical block 11 operate. Along with this, image data (stored image data) of one frame supplied from the preprocessing circuit 13 is processed by the digital signal processing part 2 and stored in the SDRAM 3. The stored image data is compressed and coded by the digital signal processing part 2, and the coded data is stored in the hard disk drive 17 and also stored in the storage medium 10 through the system bus 55 and the medium interface 4.

Note that, the CPU 51 acquires the date and time of shooting from the watch circuit 54 to attach the acquired date and time to still image data, and stores the still image data in the hard disk drive 17 and the storage medium 10. Further, position data, direction data and attitude data acquired from the sensor part 7 are also attached to the acquired image data. Still further, in the case of the still image, data of a reduced image of the still image is created and the data of the reduced image is stored in the hard disk drive 17 and the storage medium 10 in relation to the original still image.

On the other hand, when the stored image data stored in the hard disk drive 17 and the storage medium 10 is reproduced, the CPU 51 causes the SDRAM 3 to read the selected stored image data in response to an operation input through the operation part 6. Then, the digital signal processing part 2 decodes the stored image data. The decoded image data is supplied to the LCD 30 through the LCD controller 8 and a reproduction image is displayed on the LCD 30.

"Sensor Part"

Figure 3:
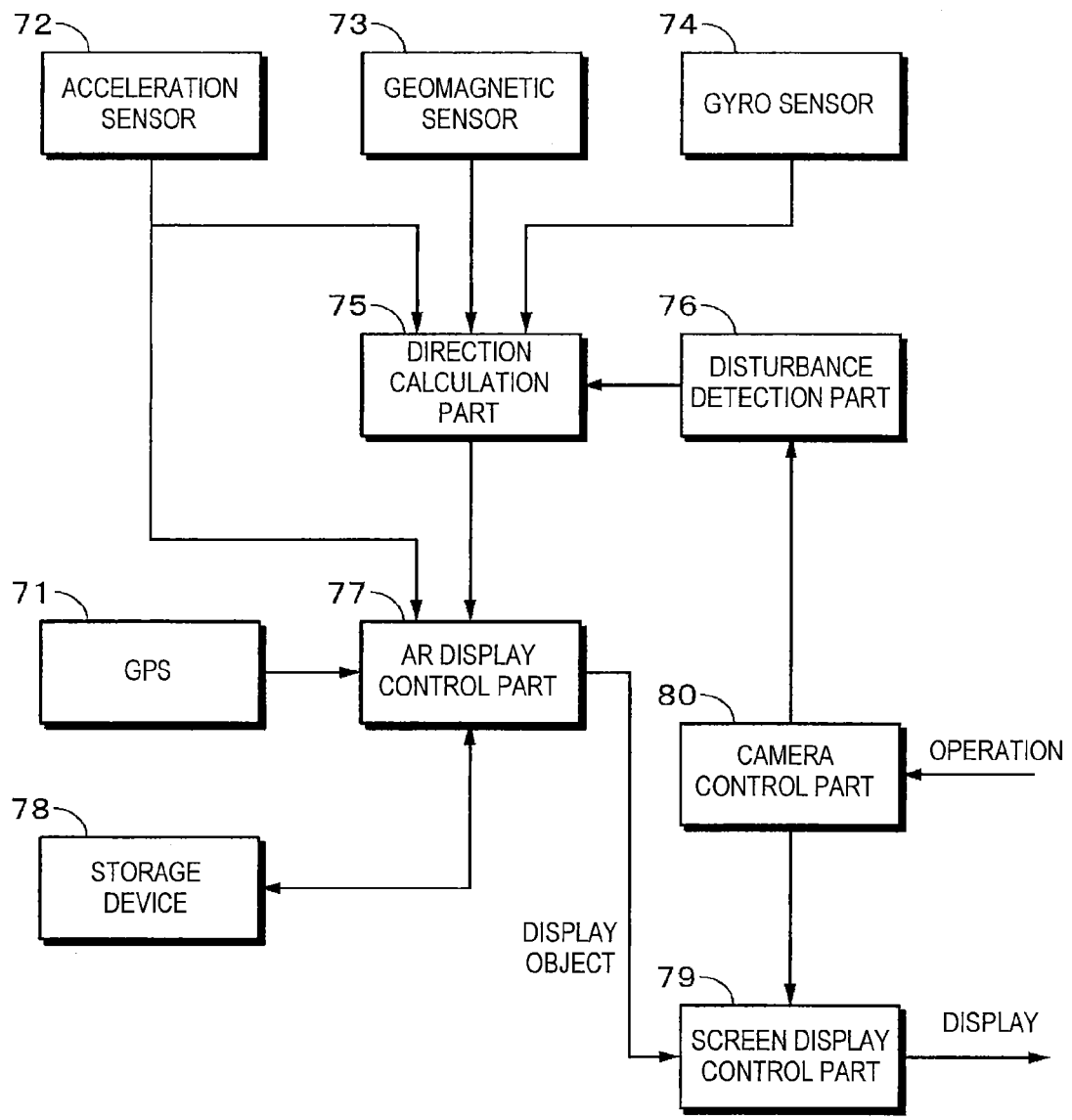
FIG. 3 is a block diagram illustrating a partial configuration of the embodiment of the image pickup apparatus according to an embodiment of the present disclosure.

The sensor part 7 includes a position detection part 71 as illustrated in FIG. 3. The position detection part 71 detects a current position of the image pickup apparatus by GPS (Global Positioning System), for example, and acquires position data of the current position. A detection signal of the position detection part 71 is supplied to an AR (Augmented Reality) display control part 77. Data from the storage device 78 is supplied to the AR display control part 77.

The AR display control part 77 is a part of a function of the control part 5. Output data from the AR display control part 77 is supplied to the LCD 30 via a screen display control part 79. AR is a technology for displaying an imaginary object on an image (shooting image) in the real environment in an overlapping manner on the LCD 30. The configuration of AR including the AR display control part 77 will be described below.

Further, the sensor part 7 includes an acceleration sensor 72, a geomagnetic sensor 73 and a gyro sensor 74. The acceleration sensor 72 is provided for detecting an attitude of the image pickup apparatus and generates acceleration data. The geomagnetic sensor 73 generates data of the magnetic direction corresponding to the geomagnetism. The gyro sensor 74 constitutes an angular velocity detection part and generates angular velocity data. Output data (digital signals) from the acceleration sensor 72, the geomagnetic sensor 73 and the gyro sensor 74 are supplied to a direction calculation part 75. The direction calculation part 75 includes a digital signal processing part such as a microcomputer. Note that, the direction calculation part 75 may perform processing for digitalization by receiving analog signals from each sensor.

Output data from a disturbance detection part 76 detecting magnetic disturbance is supplied to the direction calculation part 75. Output signals from a camera control part 80 are supplied to the disturbance detection part 76, and information related to the magnetic disturbance inside the apparatus is acquired from the output signals from the camera control part 80. Further, the output signals from the camera control part 80 are supplied to the screen display control part 79, and the screen display control part 79 acquires angle of view information.

In the present disclosure, both of disturbance recognition detecting a magnetic disturbance currently occurring inside the image pickup apparatus and disturbance prediction predicting a possible magnetic disturbance inside the image pickup apparatus are performed. The disturbance detection part 76 detects, from immediately before the magnetic disturbance occurs, a period during which the magnetic disturbance is occurring as a disturbance period. The disturbance detection part 76 can detect the disturbance period by supply of a camera control signal to the disturbance detection part 76 from the camera control part 80.

For example, when the user operate the zoom lever of the image pickup apparatus, an onboard motor rotates to drive the lens and driving by the motor causes the magnetic disturbance to occur. Accordingly, a control signal corresponding to the operation of the zoom lever is generated and the disturbance detection part 76 detects a period during which a zoom motor is rotating. Similarly, the disturbance detection part 76 detects a magnetic disturbance caused by charge and discharge of a strobe light, driving of an iris motor and the like other than the zoom operation. Note that, though in the case where it is difficult to obtain the corresponding signal during the period the motor is actually rotating, in the case where the period during which the motor or the like is rotating is known based on the user operation, the known period is detected as the disturbance period.

Output data from the acceleration sensor 72, the geomagnetic sensor 73, the gyro sensor 74 and the disturbance detection part 76 are supplied to the direction calculation part 75 and the direction calculation part 75 outputs the direction data. The output direction data is supplied to the AR display control part 77. The direction data represents a current shooting direction (in a horizontal plane) of the image pickup apparatus. Further, output signals from the acceleration sensor 72 are supplied to the AR display control part 77. The acceleration sensor 72 has a function of an attitude detection part and acquires the attitude data representing a current shooting direction (in a vertical plane) of the image pickup apparatus. A shooting angle is represented by the direction data and the attitude data.

"Direction Detection Processing"

A direction detection part of the sensor part 7 is achieved by a combination of the magnetic direction detected by the geomagnetic sensor 73 and the integration direction detected by the gyro sensor (angle velocity sensor) 74 and has high response and noise resistance. By constantly monitoring the output value of each sensor and an operational state of the image pickup apparatus, a magnetic direction priority mode and an integration direction priority mode are dynamically switched. The magnetic direction priority mode is a state where the magnetic direction obtained from the geomagnetic sensor 73 is used as the final output direction. The integration direction priority mode is a state where the integration direction obtained by the gyro sensor 74 is used as an output on a priority basis.

Figure 4:
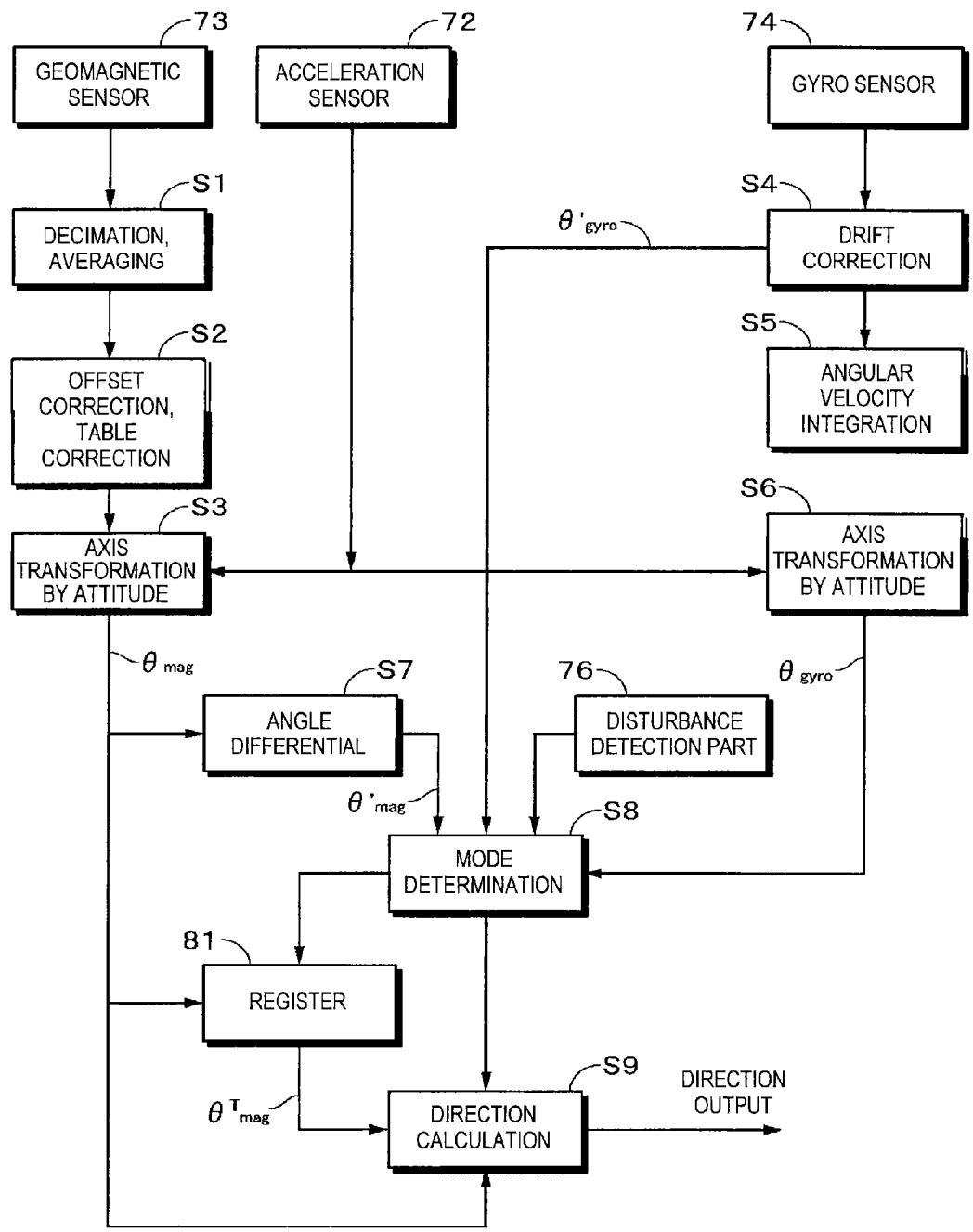
FIG. 4 is a flowchart explanatory of a direction detection operation performed by a sensor part.

The direction detection processing performed by the direction calculation part 75 will be described with reference to a flowchart of FIG. 4. Decimation processing and averaging processing S1 are performed by filters on signals output from the geomagnetic sensor 73 in order to cancel fluctuation. Subsequently, various kinds of correction processing S2 such as offset correction and table correction are performed. Then, axis transformation processing by an attitude (correction processing of a sensor attitude) S3 is performed based on an output of the acceleration sensor 72, and magnetic direction data $\theta$mag is output. In the magnetic direction priority mode, the magnetic direction data $\theta$mag obtained from the geomagnetic sensor 73 is used as the last direction output.

Drift correction processing S4 is performed on angular velocity data output from the gyro sensor 74 in order to inhibit accumulation of errors and angular velocity data $\theta$'gyro is output. Angular velocity integration processing S5 is performed on the angular velocity data $\theta$'gyro and angle data is obtained. Further, axis transformation processing by an attitude (correction processing of a sensor attitude) S6 is performed based on the output of the acceleration sensor 72, and integration direction (angle) data $\theta$gyro is output.

The acceleration sensor 72 is used for detecting an attitude of the image pickup apparatus. In the case where the image pickup apparatus only rotates on the horizontal plane around the vertical axis, the acceleration sensor 72 is unnecessary. However, the attitude of the mobile apparatus such as the image pickup apparatus is not fixed and angles of the sensors attached to the apparatus continuously change, so that the attitude is measured by a three-axis acceleration sensor to correct the output value of the direction.

Angle differential processing S7 is performed on the magnetic direction data $\theta$mag to become $\theta$'mag in order to detect a change in the direction. For example, an amount of change of the direction in one second is detected. Mode determination processing S8 is performed by using the differentiated magnetic direction data $\theta$'mag, the angular velocity data $\theta$'gyro and information of magnetic disturbance state from the disturbance detection part 76. That is, in the mode determination processing S8, either of two modes, the magnetic direction priority mode or the integration direction priority mode is set. The mode determination processing S8 is equivalent of dynamic switching between two modes depending on the situation.

The disturbance detection part 76 can detect the magnetic disturbance state. The detection includes both magnetic disturbance occurrence prediction predicting the magnetic disturbance and magnetic disturbance recognition recognizing that magnetic disturbance is currently occurring. During the period during which the magnetic disturbance is detected, the mode determination processing S8 in the direction calculation part 75 is notified of being under the magnetic disturbance state.

The determination result of the mode determination processing S8 is supplied to direction calculation processing S9. A register 81 is provided and a magnetic direction $\theta^T$mag at a time point T when the magnetic direction priority mode is switched into the integration direction priority mode is held by the register 81. The magnetic direction $\theta^T$mag at the time point when the disturbance detection part 76 detects disturbance is stored in the register 81 in the case where an amount of change in direction is below a threshold value and the angular velocity is also below a threshold value as described below. In this sense, the magnetic direction closest to the time point when the disturbance is detected becomes $\theta^T$mag. $\theta^T$mag held in the register 81 can be used in the direction calculation processing S9. As a result of the direction calculation processing S9, the final direction data is output.

Figure 5:
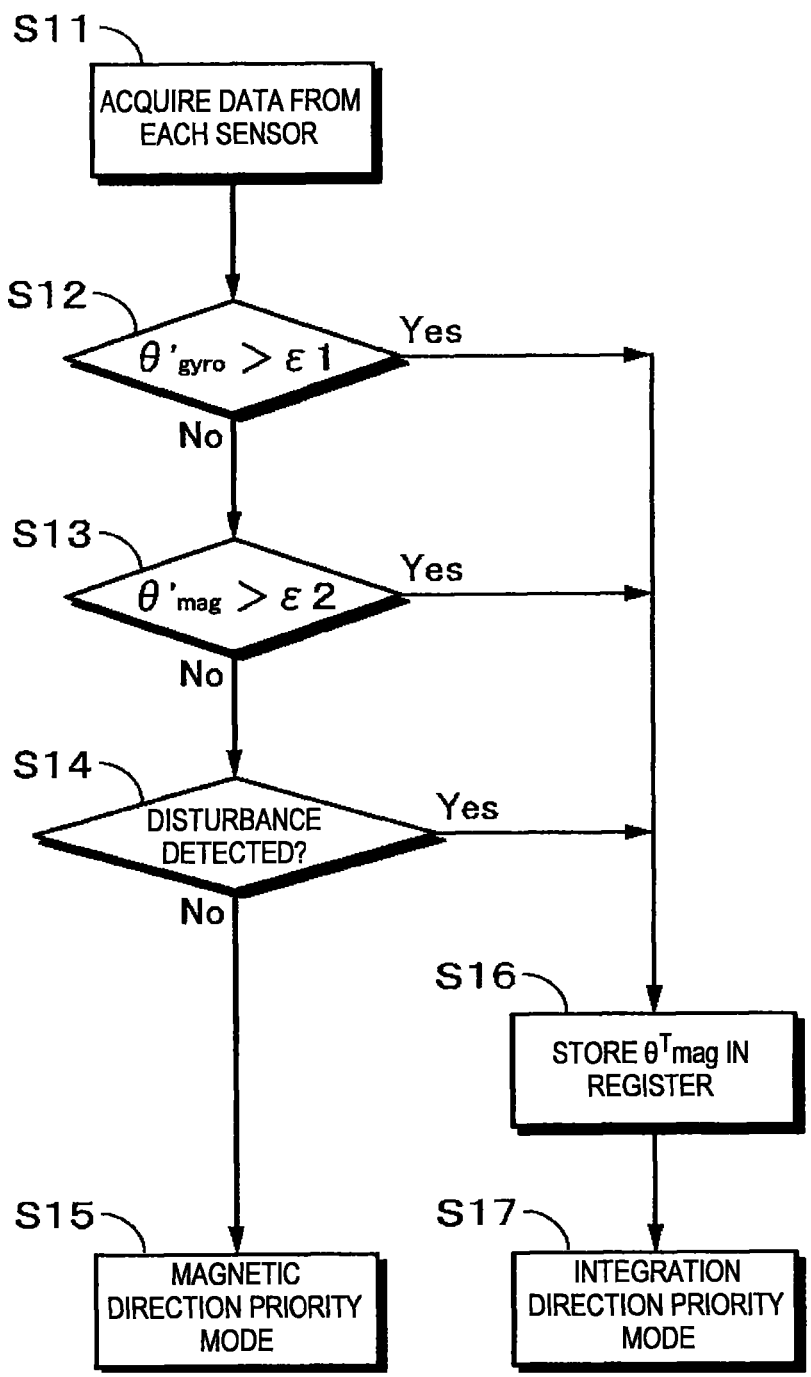
FIG. 5 is a flowchart explanatory of mode switching in direction detection performed by the sensor part.

The mode determination processing S8 will be described in detail with reference to a flowchart illustrated in FIG. 5. Assuming that a preliminarily set arbitrary first threshold value is described as $\epsilon 1$ and a preliminarily set arbitrary second threshold value is described as $\epsilon 2$. Further, assuming that time at the time point when the mode becomes the integration direction priority mode by the mode determination processing is described as T. The time point T becomes a base point in time of the integration processing.

In the first step S11, data from each sensor is acquired. In the subsequent step S12, comparison processing ($\theta$'gyro>$\epsilon 1$) is performed. This comparison processing is the processing for determining whether the angular velocity data $\theta$'gyro output from the gyro sensor 74 is smaller than the threshold value $\epsilon 1$, and in the case where the angular velocity data $\theta$'gyro is larger than or equal to the threshold value $\epsilon 1$, the processing proceeds to step S16. Step S16 is the processing for storing the magnetic direction data $\theta^T$mag of the time point T in the register 81. After performing step S16, the integration direction priority mode is set (step S17).

In the case where the angular velocity data $\theta'$gyro is smaller than or equal to the threshold value $\epsilon 1$, comparison processing ($\theta'$mag>$\epsilon 2$) is performed in step S13. In the case where the differentiated magnetic direction data $\theta'$mag (that is, change amount in magnetic direction data) is smaller than or equal to the threshold value $\epsilon 2$, whether the disturbance detection part 76 detects the disturbance is determined in step S14. In the case where the disturbance is not detected, the magnetic direction priority mode is set in step S15. The final output direction data $\theta$ in the magnetic direction priority mode is the magnetic direction data $\theta$mag detected by the geomagnetic sensor 73.

In the case where the magnetic direction priority mode is not set, the integration direction priority mode is set. In the integration direction priority mode, the final output direction is represented as the following formula. That is, the magnetic direction $\theta^T$mag at the time point T when the mode is switched from the magnetic direction priority mode to the integration direction priority mode is stored in the register 81 as a reference value. Angle data obtained by integration of the angular velocity data during a predetermined time period after the time point of storing the reference value is added to the reference value as an offset. That is, the direction output data in the integration direction priority mode is represented as the following formula.

Output direction data $\theta = \theta^T$mag$+ \int \theta'$gyro $dt$

Note that, a mathematical symbol $\int$ represents integration until a predetermined time t when letting the time point T be zero.

In the above-described present disclosure, the direction can be obtained in a highly responsive manner. Because of this, an actual direction of the apparatus and a display object show high correspondence when displaying the display object based on the direction. Accordingly, when an input to the magnetic sensor changes due to a change in the surrounding environment though the direction of the apparatus does not alter actually, the influence can be limited. For example, a temporary magnetic disturbance is sometimes observed when a vehicle or the like passes across in front of a user of the apparatus. This is infected by electromagnetic waves irradiated from the vehicle or a magnetic field generated by the vehicle. The magnetic sensor has many error causes generally including infections of the magnetic field and the electromagnetic waves, and a soft iron effect by a steel sheet. It may be virtually not possible to deal with all of the infections caused by errors to eliminate the errors but it may be possible for a technique of the present disclosure to deal with a large change of a magnetic field within a relatively short time such as an example of the above-described vehicle. In particular, according to the present disclosure, in the case where the magnetic disturbance is predicted depending on user operation or a change in an internal state of the apparatus of the mobile, the direction can be output by prioritizing the integration direction without being affected by the magnetic disturbances.

"Imaginary Object"

The present disclosure has a function of guiding a user to take good pictures. For the purpose of guiding, an imaginary object is displayed by AR on a screen of the LCD 30 on which a subject is displayed. The imaginary object changes as a real subject in response to a shooting position, the shooting angle and the angle of view. The imaginary object includes a first display object and a second display object. Note that, in order to display the imaginary object so as to successfully follow an image of the real environment obtained by the image pickup apparatus, the direction of the camera is detected in a highly responsive manner.

Information of the first and the second display objects is created by an AR display control part 56. An output signal from the sensor part 7 is supplied to the AR display control part 56 as described above. Further, composition data is supplied from a storage device 57 to the AR display control part 56. Reference position data (e.g., latitude and longitude information) indicating a recommended shooting spot and recommended composition data in relation to landscapes and buildings of tourist spots are stored in the storage device 57. The composition data includes reference angle data related to the shooting angle and reference angle of view data related to the angle of view.

The reference position data, the reference angle data and the reference angle of view data (hereinafter, those pieces of data are collectively referred to as reference data as necessary) are preliminarily stored in the storage device 78 (See FIG. 3). The reference data may be stored in the storage device 78 by acquiring the reference data via the Internet, for example. For example, when the user sets a guide mode as a shooting mode, the reference data of a photograph near the current position of the image pickup apparatus (user) is retrieved and the retrieved reference data is read out from the storage device 78 and supplied to the AR display control part 77.

The AR display control part 77 creates display objects corresponding to the first and the second display objects by using current data output from the sensor part 7 and the reference data. The display objects are supplied to the screen display control part 79 and display signals for screen display on the LCD 30 are created. Further, a user camera operation signal is supplied to the camera control part 80 and control necessary for shooting is performed. As described above, the disturbance detection part 76 detects the magnetic disturbance predicted to occur inside the image pickup apparatus and the magnetic disturbance occurred inside the image pickup apparatus by a control signal generated from the camera control part 80. Further the angle of view information related to the angle of view is supplied to the screen display control part 79.

The angle of view is a range capable of shooting through the lens and varies depending on the focal point distance of the lens. Generally, the shorter the focal point distance is, the larger the angle of view is, and the longer the focal point distance is, the smaller the angle of view is. Accordingly, though shooting the same subject, the shooting ranges are different and the composition of the shooting angle of views varies when the angle of views are different. Further, since the angle of view is affected not only by the focal point distance but also by lens characteristics, information of the lens characteristics is necessary as angle of view information. Still further, though the focal point distance is the same, the larger an area of the imaging element is, the larger the angle of view is, and the smaller the area of the imaging element is, the smaller the angle of view is. The area of the imaging element is a constant value according to the model of the image pickup apparatus. Note that, the angle of view includes three types of information, a horizontal angle of view, a vertical angle of view and a diagonal angle of view. All of the information may be used and only some of the information may be used. The angle of view is measured in degrees.

In view of the above description, the angle of view information calculated from the focal point distance, the lens characteristics and other information is supplied from the camera control part 80 to the screen display control part 79. As another constitution, the angle of view information is calculated by the focal point distance supplied from the camera control part 80 and necessary data such as the lens characteristics in the screen display control part 79. The display object representing the angle of view serving as the guidance for shooting is created depending on a relationship between the angle of view serving as the guidance for shooting and the current angle of view.

Figure 6:
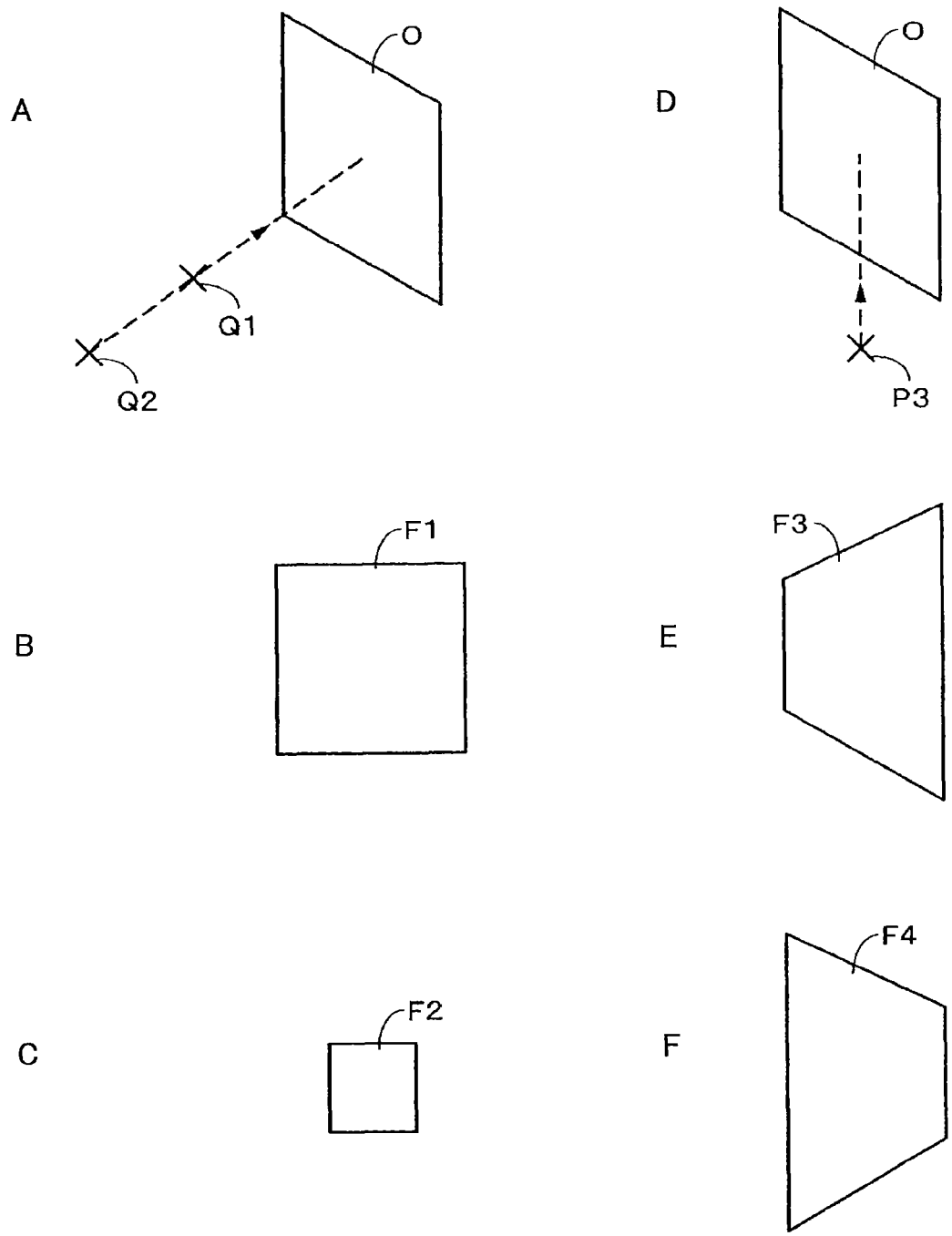
FIGS. 6A through 6F are schematic diagrammatic views explanatory of display object.

The display object created by the AR display control part 77 will be roughly described with reference to FIG. 6. For simplicity, it is assumed that the area of the imaging element and the focal point distance are constant. For example, a rectangular frame-shaped subject O is assumed as the imaginary object. As illustrated in FIG. 6A, it is assumed that the subject O is shot at a shooting position Q1. In the case where the shooting position Q1 and the shooting angle are respectively identical with the reference position data and the reference angle data stored in the storage device 78, a square frame F1 as illustrated in FIG. 6B is created as the display object. In the case where the subject O is shot at a farther shooting point Q2 with keeping the same shooting angle, a smaller square frame F2 as illustrated in FIG. 6C is created as the display object. When the frame F2 is displayed, it is found that the user stands too farther away from the subject in comparison with the recommended position.

As illustrated in FIG. 6D, in the case where the subject O is shot from a distance equal to the reference position data at a different angle, a distorted frame F3 as illustrated in FIG. 6E is created as the display object. In the case where the shooting angle tilts toward the opposite side, an obliquely distorted frame F4 as illustrated in FIG. 6F is created as the display object. The user adjusts the shooting angle so as to correct the distortion of the shape of the frame. As described above, the frame is represented as the display object on the two-dimensional display surface converted from the three-dimensional subject and serves to guide the user to the recommended shooting position and shooting angle by the size and shape of the frame.

That is, because the imaginary display object (frame) is displayed on the real subject in an overlapping manner on the screen of the LCD 30, the user can shoot a photograph similar to a recommended image by shooting the photograph after setting the shooting position and the shooting angle such that the frame has a figure without distortion such as a square with the size the maximum within the screen or the frame disappears beyond the screen. Because the imaginary display object is, for example, represented as the two-dimensional display object converted from the three-dimensional object, the user can easily recognize the current shooting position and shooting angle.

"Specific Examples of Display Object"

Figure 7:
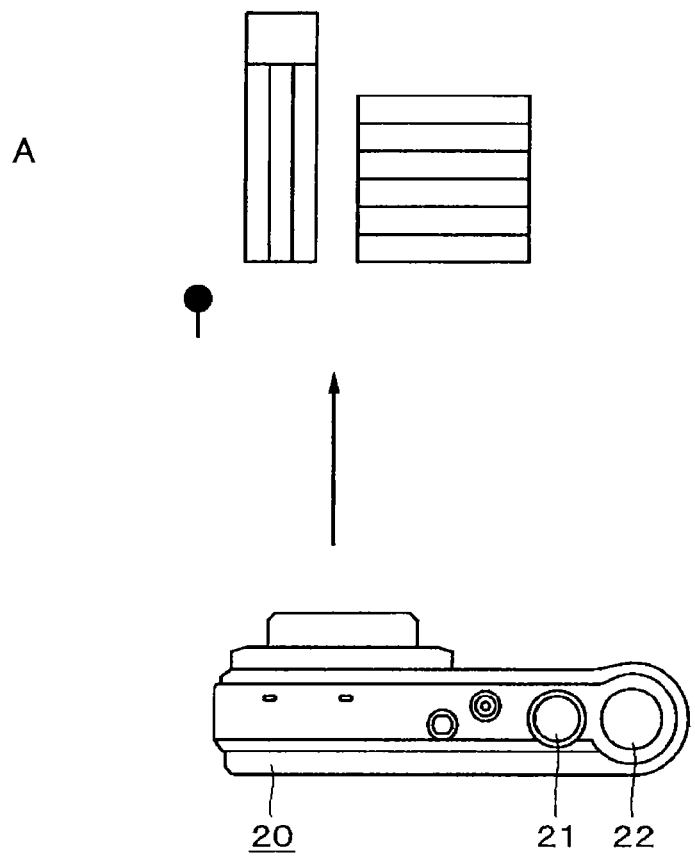
FIG. 7A is a schematic diagrammatic view illustrating a positional relationship between the image pickup apparatus according to an embodiment of the present disclosure and a subject.
FIG. 7B is a schematic diagrammatic view illustrating display on an LCD screen of the image pickup apparatus according to an embodiment of the present disclosure.
Figure 7:
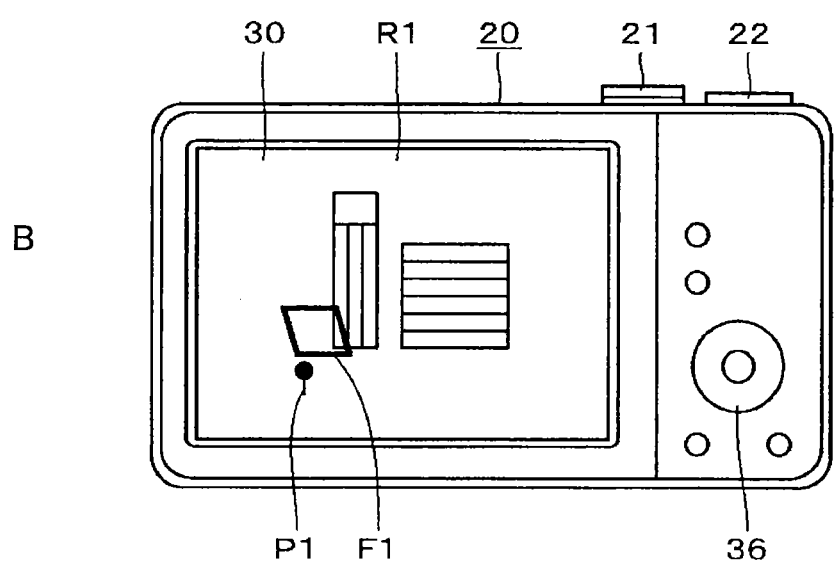

The present disclosure will be described further. When real subjects such as buildings are shot by an image pickup apparatus 20 as illustrated in FIG. 7A, a pin P1 as the first display object and a frame F1 as the second display object are displayed on an LCD 30 of the image pickup apparatus 20 in addition to the subject image R1 as illustrated in FIG. 7B. The pin and the frame represent a set of shooting compositions. The pin mark illustrated in FIG. 7A does not exist as the real landscape but drawn to make the current position of the image pickup apparatus 20 clear. The pin P1 in the displayed image indicates the position (shooting spot) on which the photographer should actually stand. The frame F1 designates the direction and the angle of view to which the image pickup apparatus should be directed. The composition is designated by the shooting position, the direction and the angle of view to which the image pickup apparatus should be directed. The reference data (shooting position and composition) stored in the storage device 57 represents a shooting point from which the "well composed" photograph can be shot at tourist spots, for example.

Figure 8:
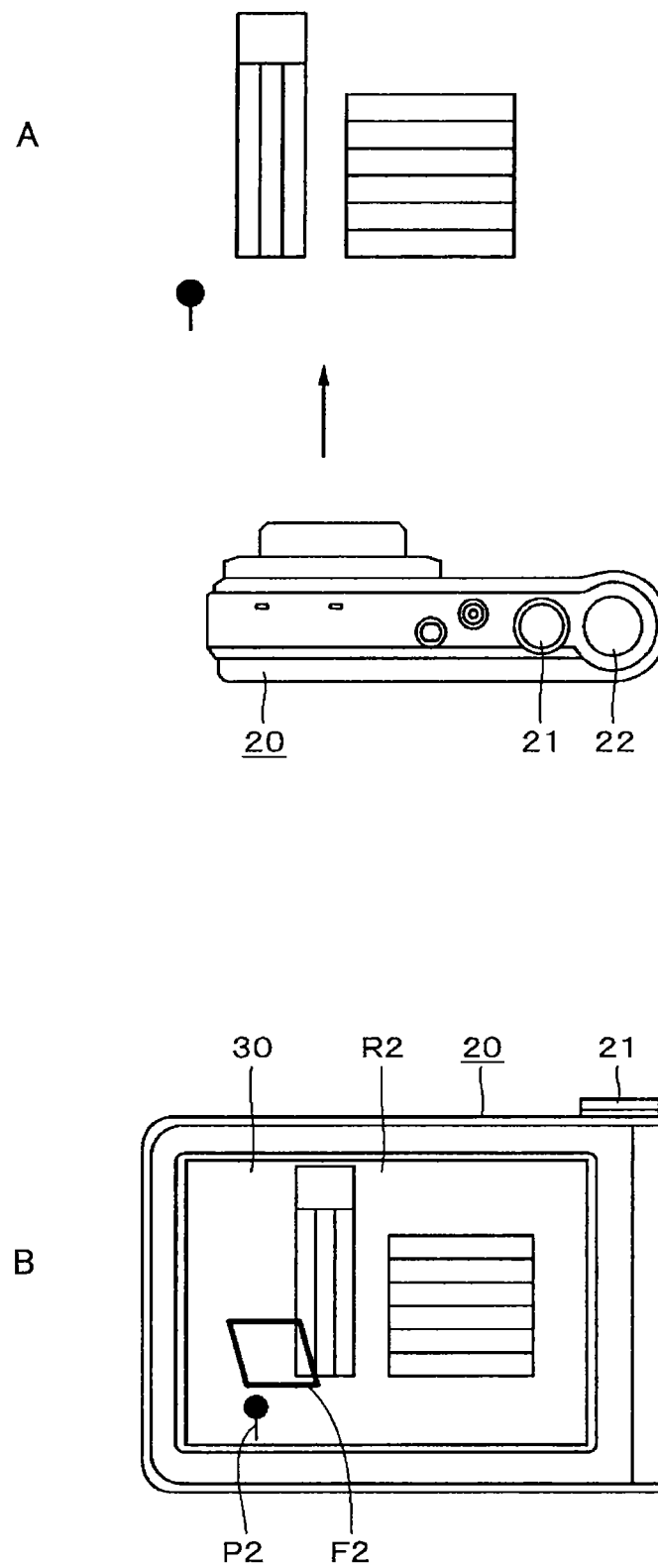
FIG. 8A is a schematic diagrammatic view illustrating a positional relationship between the image pickup apparatus according to an embodiment of the present disclosure and the subject.
FIG. 8B is a schematic diagrammatic view illustrating display on the LCD screen of the image pickup apparatus according to an embodiment of the present disclosure.

As illustrated in FIG. 8A, in the case where the user further approaches the subject beyond the shooting position illustrated in FIG. 7A, a subject image R2, a pin P2 and a frame F2 are displayed on the LCD 30 of the image pickup apparatus 20 as illustrated in FIG. 8B. Those images grow larger under approaching closer to the subject. Because the shooting angle and the angle of view towards the subject have not changed, the shape of the frame F2 corresponds to that of the enlarged frame F1. The frame and the pin as the display objects are redrawn by acquiring the position information, the direction information, the attitude information and the angle of view information of the image pickup apparatus every predetermined period of time and by using the acquired information.

Figure 9:
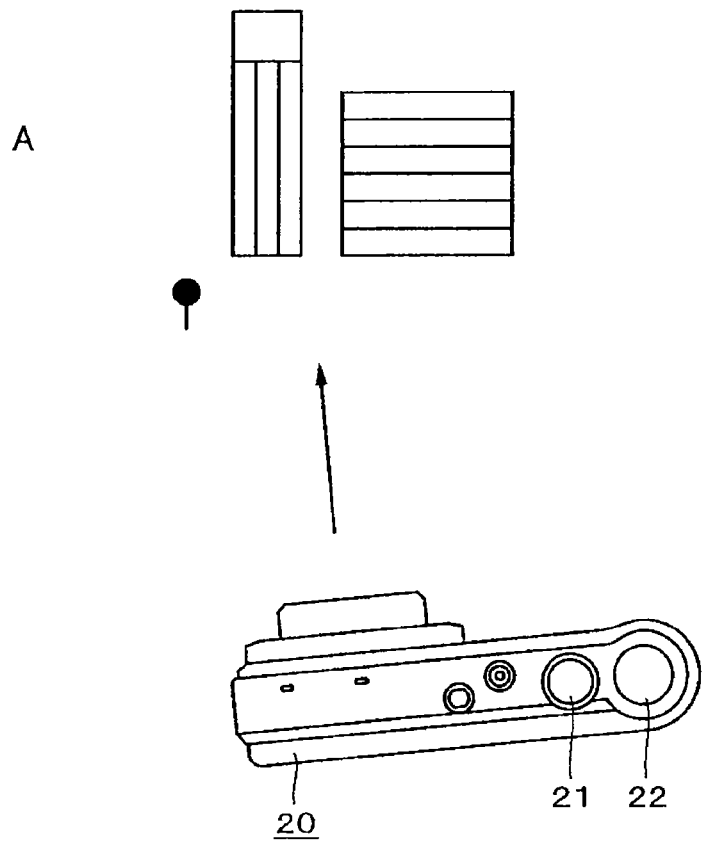
FIG. 9A is a schematic diagrammatic view illustrating a positional relationship between the image pickup apparatus according to an embodiment of the present disclosure and the subject.
FIG. 9B is a schematic diagrammatic view illustrating display on the LCD screen of the image pickup apparatus according to an embodiment of the present disclosure.
Figure 9:
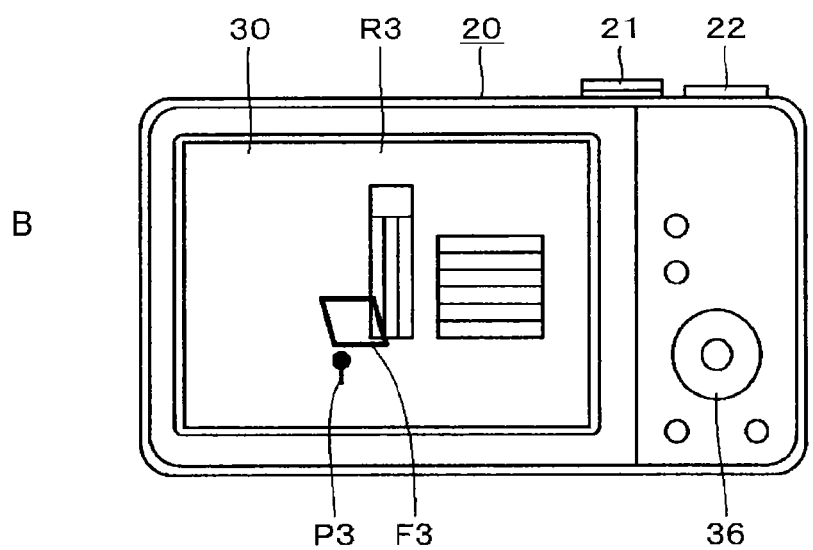
Figure 10:
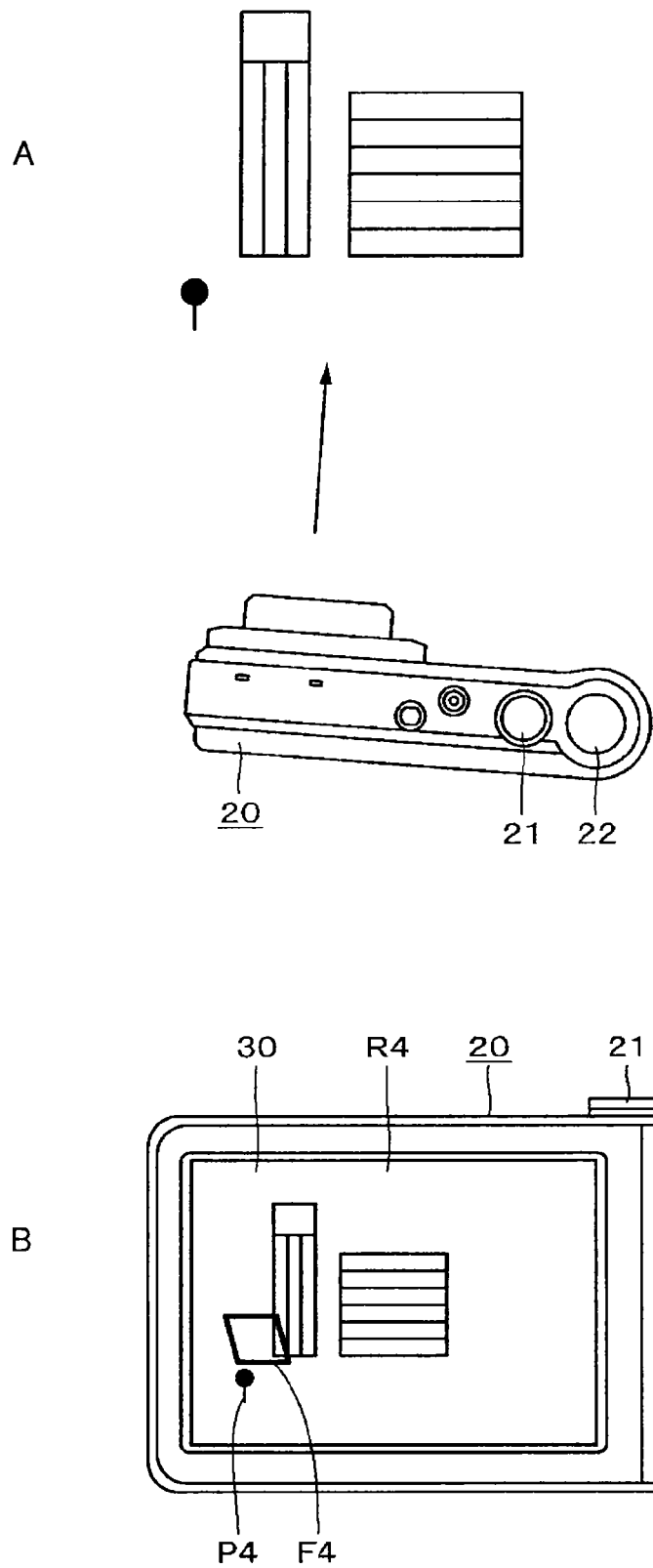
FIG. 10A is a schematic diagrammatic view illustrating a positional relationship between the image pickup apparatus according to an embodiment of the present disclosure and the subject.
FIG. 10B is a schematic diagrammatic view illustrating display on the LCD screen of the image pickup apparatus according to an embodiment of the present disclosure.

As illustrated in FIG. 9A, in the case where the direction (shooting direction) of the image pickup apparatus 20 is tilted leftward on the shooting position similar to that illustrated in FIG. 7A, a subject image R3, a pin P3 and a frame F3 are displayed on the LCD 30 of the image pickup apparatus 20 at the position shifted to the right as illustrate in FIG. 9B. As illustrated in FIG. 10A, in the case where the direction (shooting direction) of the image pickup apparatus 20 is tilted rightward on the shooting position similar to that illustrated in FIG. 7A, a subject image R4, a pin P4 and a frame F4 are displayed on the LCD 30 of the image pickup apparatus 20 at the position shifted to the left as illustrate in FIG. 10B.

Figure 11:
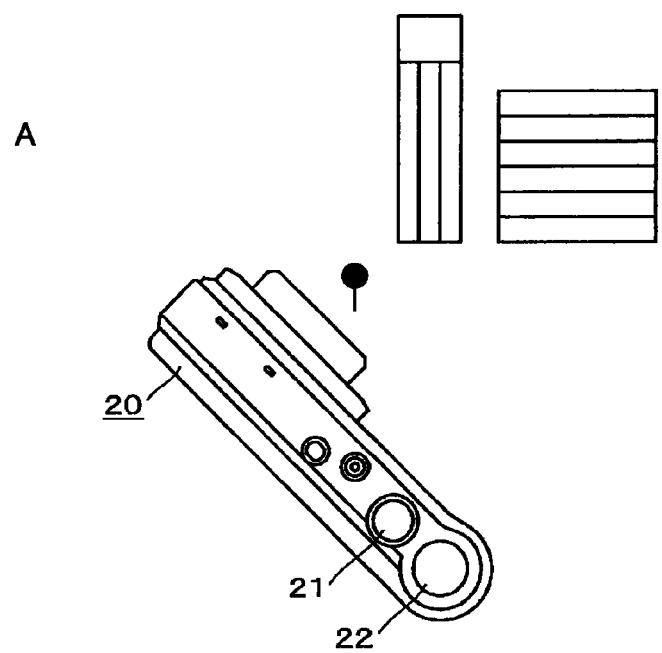
FIG. 11A is a schematic diagrammatic view illustrating a positional relationship between the image pickup apparatus according to an embodiment of the present disclosure and the subject.
FIG. 11B is a schematic diagrammatic view illustrating display on the LCD screen of the image pickup apparatus according to an embodiment of the present disclosure.
Figure 11:
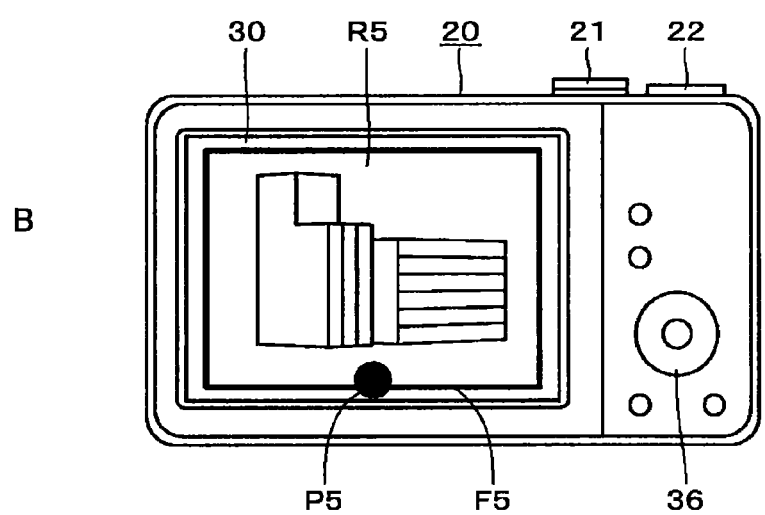

As described above, the pin and the frame displayed on a screen of the LCD 30 change similar to the subject in the real environment in response to movement of the image pickup apparatus 20. Further, as illustrated in FIG. 11A, when the user approaches the recommended shooting point, an image illustrated in FIG. 11B is displayed on the LCD 30. Because the shooting angle and the angle of view are substantially equal to the reference shooting angle and the shooting angle of view, a square frame F5 is displayed on the entire display screen. The subject image R5 becomes the image fairly close to the recommended shooting image and a pin P5 is displayed to guide the user to find that the recommended shooting point is slightly closer to the subject than the current position.

Figure 12:
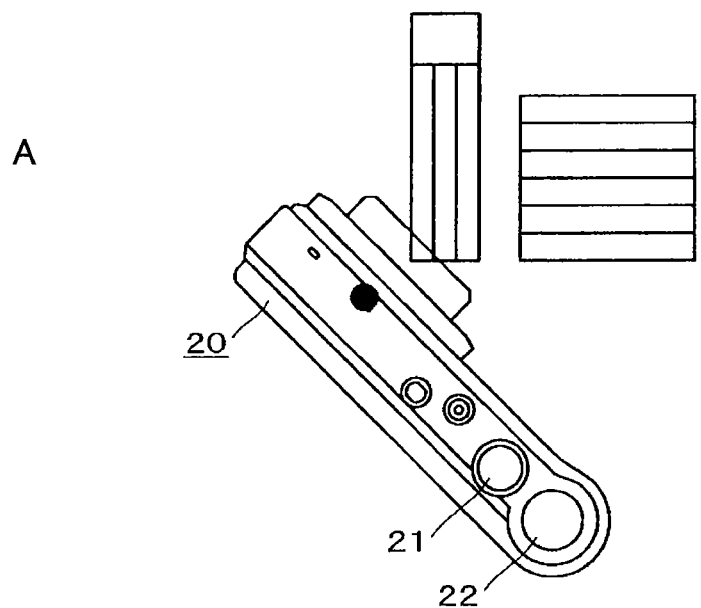
FIG. 12A is a schematic diagrammatic view illustrating a positional relationship between the image pickup apparatus according to an embodiment of the present disclosure and the subject.
FIG. 12B is a schematic diagrammatic view illustrating display on the LCD screen of the image pickup apparatus according to an embodiment of the present disclosure.
Figure 12:
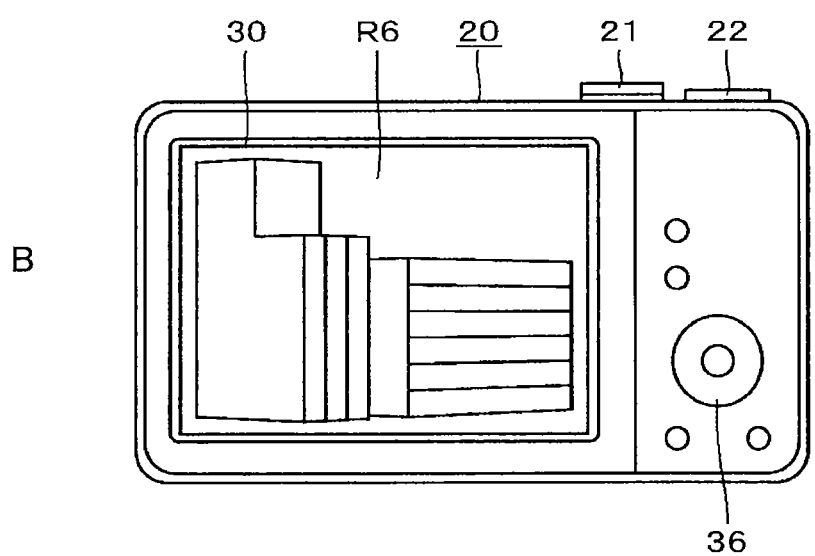

The user approaches the subject slightly closer on seeing the screen of the LCD 30 illustrated in FIG. 11B. Then, the image pickup apparatus 20 reaches the position identical with the reference shooting position as illustrated in FIG. 12A. In this case, the LCD 30 shows the screen illustrated in FIG. 12B. That is, a frame and a pin disappear from the screen and only a shot subject image R6 is displayed on the screen of the LCD 30. As described above, disappearance of the frame and the pin from the screen of the LCD 30 makes the user find that the user reaches the reference shooting position, and find that the current direction and attitude of the image pickup apparatus 20 coincide with the reference shooting angle, and further find that the current angle of view coincides with the reference angle of view. When a shutter button 21 is pressed in this condition, a photograph having the recommended composition can be shot.

Figure 13:
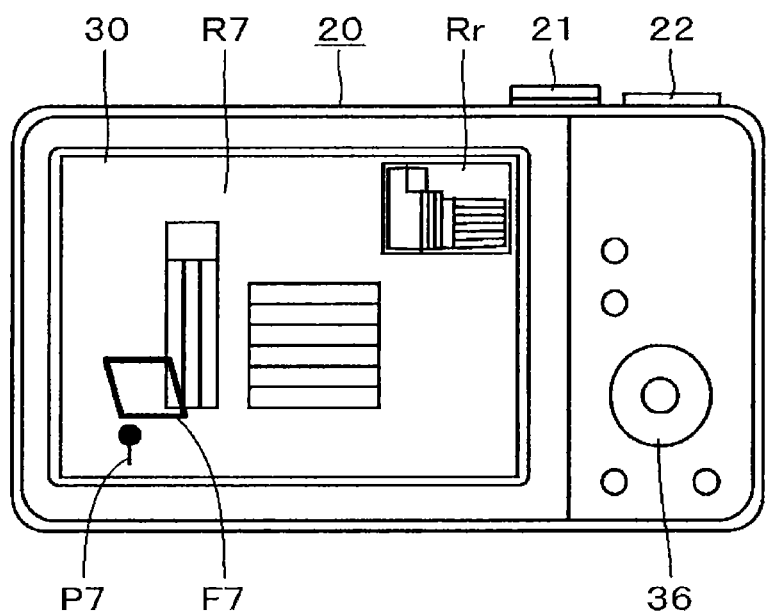
FIG. 13 is a schematic diagrammatic view illustrating another example of display on the LCD screen of the image pickup apparatus according to an embodiment of the present disclosure.

As illustrated in FIG. 13, a thumbnail (reduced image) Rr of the recommended image shot at the reference shooting position at the reference angle and the reference angle of view may be displayed on the screen of the LCD 30 in addition to a subject image R7, a frame F7 and a pin P7. The user can set the shooting position, the shooting angle and the angle of view on the pattern of the thumbnail. Note that, a semi-transmissive image may be displayed as a pattern instead of the thumbnail. The user can grasp from the thumbnail the composition of the photograph capable of shooting from the shooting point though not actually going to the shooting point. Further, the user can recreate a preferred composition more accurately by shooting a photograph referring to the thumbnail.

Figure 14:
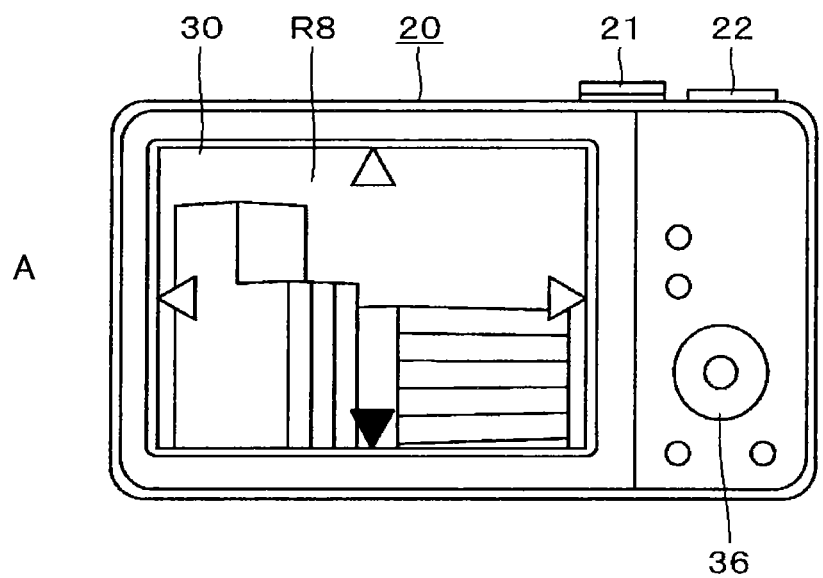
FIGS. 14A and 14B are schematic diagrammatic views illustrating still other examples of display on the LCD screen of the image pickup apparatus according to an embodiment of the present disclosure.
Figure 14:
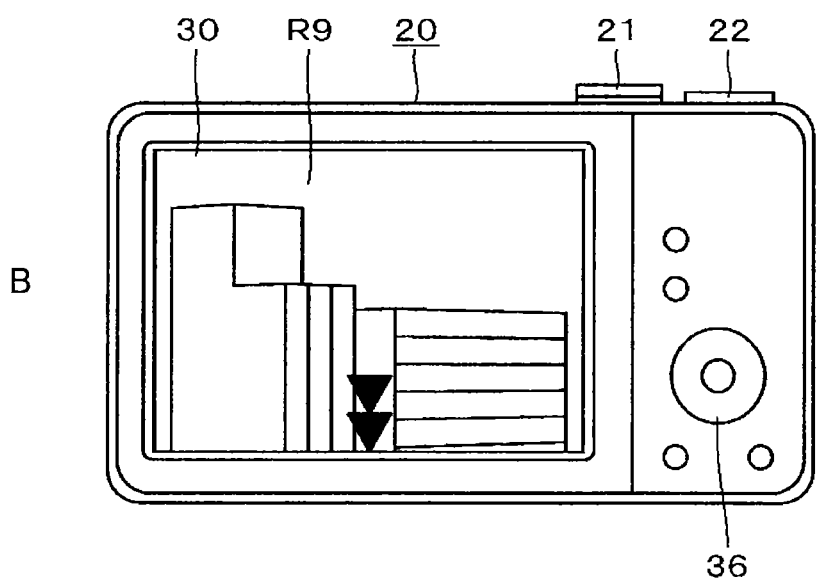

Further in the present disclosure, in the case of being coincident with the reference shooting position, the reference angle and the reference angle of view, the frame F and the pin P disappear from the screen of the LCD 30 as illustrated in FIG. 12B, so that it is difficult for the user to find that the user reaches too closer beyond the reference shooting position. In order to avoid such problem, cursors indicating directions approaching the reference shooting position may be displayed on subject images R8 and R9 in an overlapping manner, respectively, as illustrated in FIG. 14A or in FIG. 14B to inform the user in the case where the user approaches closer after the frame disappears from the screen.

As described above, when the user changes the facing direction of the image pickup apparatus, output signals from the direction calculation part 75 and the acceleration sensor 72 change. Display positions of the pin and the frame are changed in response to values of the output signals. As in the example illustrated in FIG. 9A, when the user changes the facing direction of the image pickup apparatus leftward by ten degrees, the display object on the LCD 30 shifts to the right at a distance in the screen corresponding to ten degrees as illustrated in FIG. 9B. Further, when the facing direction of the image pickup apparatus is changed upward, all of the display objects on the LCD 30 are shifted downward. The angle of view of the image pickup apparatus changes the display, too. For example, in the case where the angle of view is wide, the display object is displayed smaller, and in the case where the angle of view is narrow, the display object is displayed larger.

"An Example of Display Conversion Processing"

Figure 15:
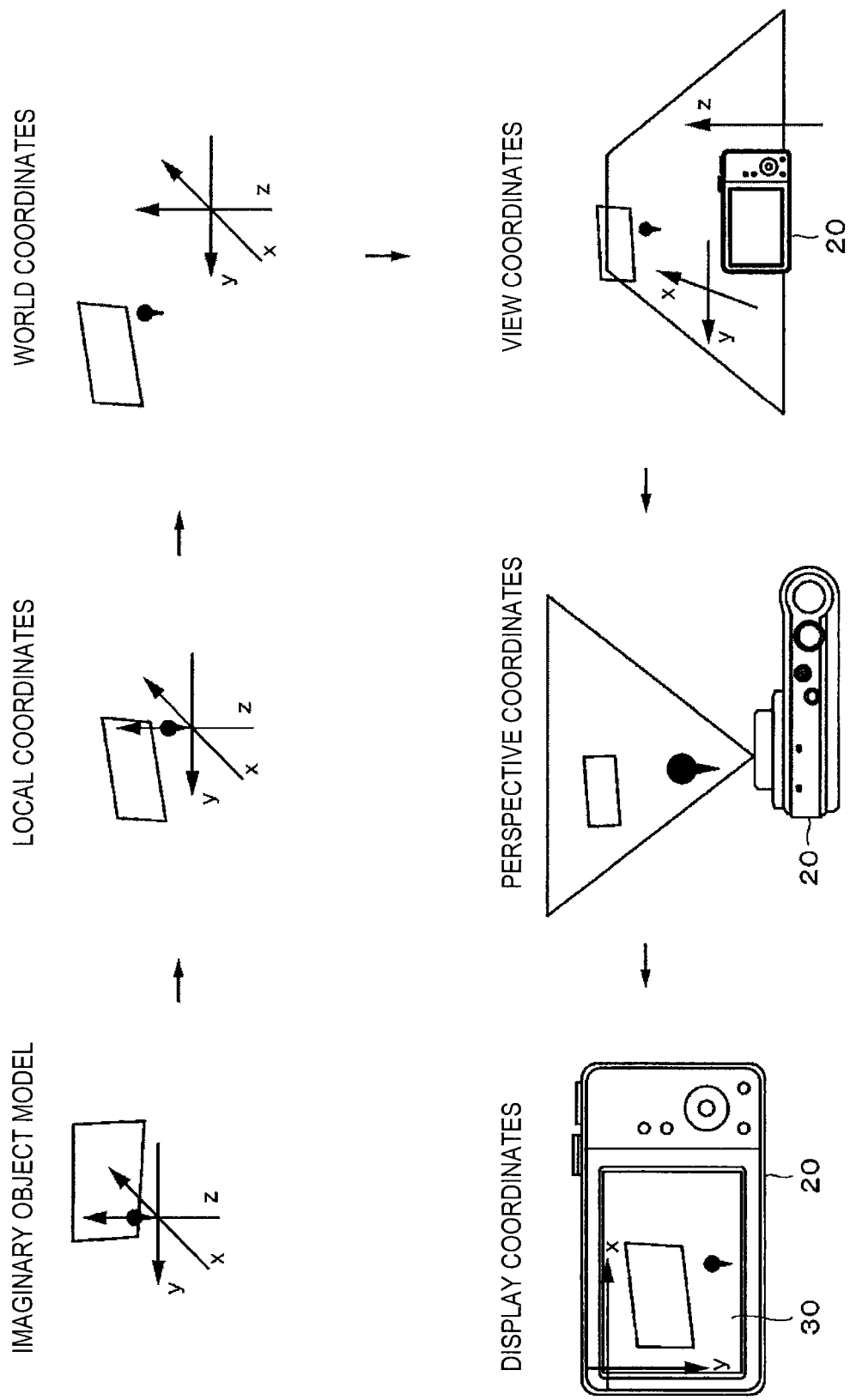
FIG. 15 is a schematic diagrammatic view explanatory of a flow of viewing pipeline processing for creating display object of the image pickup apparatus according to an embodiment of the present disclosure.

The following display conversion is consistently performed as an example by real-time viewing pipeline processing widely used in three-dimensional games and the like. FIG. 15 illustrates a flow of the viewing pipeline processing performed by the AR display control part 77. The viewing pipeline processing is a series of coordinate conversion in which a three-dimensional model represented by three-dimensional data is sterically displayed on a two-dimensional plane. By this processing, when the user sees scenes through the image pickup apparatus, the user can feel as if the imaginary pin and frame exist in the real space.

FIG. 15 illustrates a flow of the viewing pipeline processing. At first, an imaginary object model is created on local coordinates. That is, the pin indicating the shooting position and the frame representing the subject are created as the imaginary object models. Next, coordinate conversion is performed in response to the shooting angle with respect to the imaginary object model and an imaginary object is defined on the local coordinates. When the imaginary object model is converted to the local coordinates, the shooting angle and the angle of view included in the composition data are used. Next, coordinate conversion to the world coordinates is performed based on the shooting position data (latitude, longitude and altitude) included in the composition data.

The world coordinates are the coordinates defined by latitude and longitude information of GPS. Next, since the imaginary object is seen from a point of view of each person, the world coordinates are converted to view coordinates. By defining the attitude, the position and the direction of the image pickup apparatus, the world coordinates are converted to the view coordinates. Based on the view coordinates, the image pickup apparatus 20 stands on the origin of the coordinates.

In the image pickup apparatus 20, since the angle of view changes by zooming or the like, the view coordinates are converted to perspective coordinates based on the angle of view information. Either one of parallel projection or perspective projection is used as a method of the coordinate conversion. Converting the view coordinates to the perspective coordinates is the equivalent of converting the 3D object to the 2D object.

Further, in order to suit for the screen of the LCD 30 of the image pickup apparatus 20, the perspective coordinates are converted to display coordinates corresponding to the size (480×640), for example, of the display screen. In this way, the imaginary object including the frame and the pin corresponding to the current position, attitude, direction and angle of view of the image pickup apparatus are displayed on the display screen of the LCD 30 of the image pickup apparatus 20.

Note that, not only the above-described viewing pipeline processing, but other processing may be applied which can change the shape and the position of the 3D imaginary object in response to the current position, attitude, direction and angle of view of the image pickup apparatus and display the resultant on the 2D display device screen.

"Processing Flow"

Figure 16:
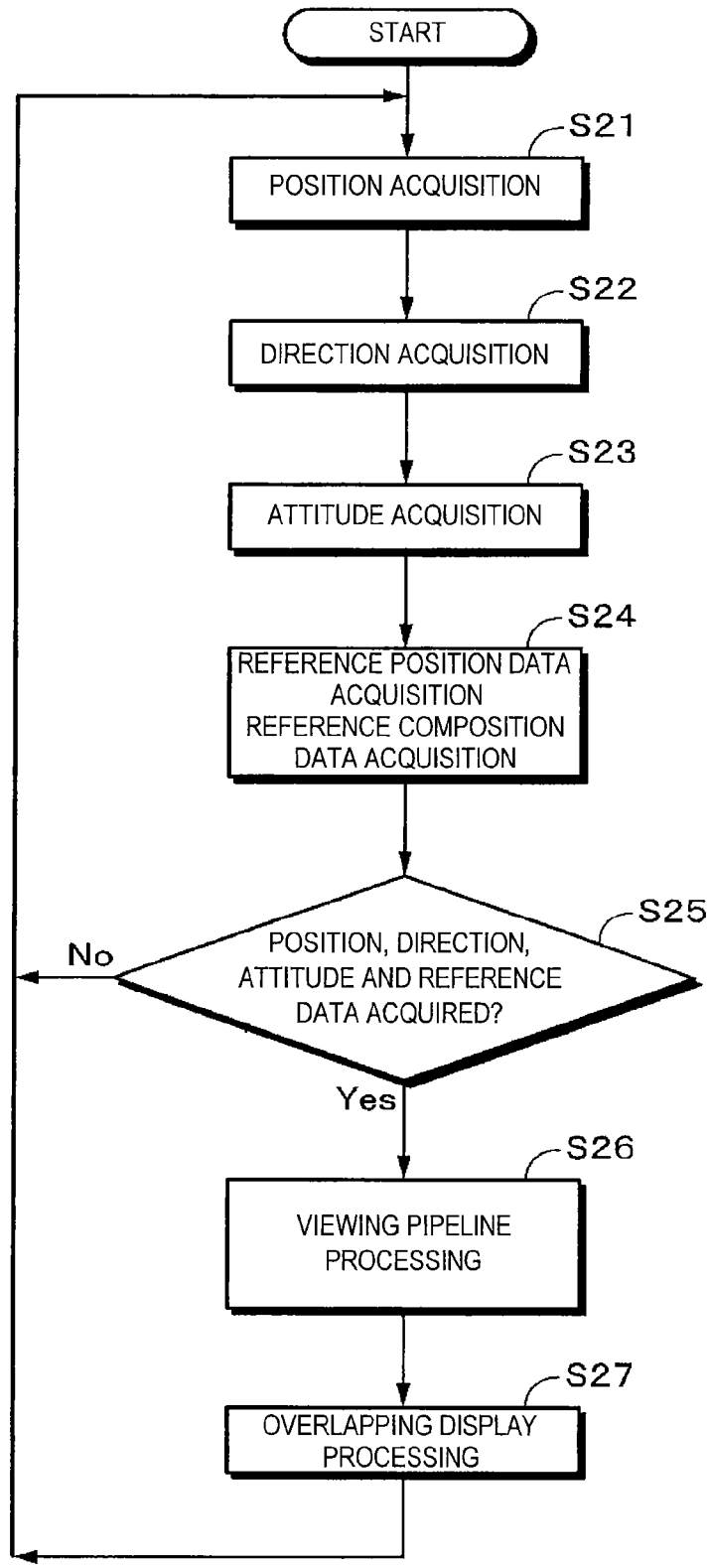
FIG. 16 is a flowchart illustrating a flow of processing in the present image pickup apparatus according to an embodiment of the present disclosure.

In the present disclosure, the processing illustrated in a flowchart of FIG. 16 is performed. This processing is performed by the AR display control part 77 (see FIG. 3). In step S21, the position detection part 71 acquires the current position data of the image pickup apparatus. Subsequently, in step S22, the direction calculation part 75 acquires the current direction data of the image pickup apparatus. Subsequently, in step S23, the acceleration sensor 72 acquires the current attitude data of the image pickup apparatus. In step S24, the reference data (reference position data and reference composition data) is acquired from the storage device 78.

In step S25, whether the current position data, direction data, attitude data and the reference data of the image pickup apparatus have been acquired is determined. When it is determined that all of the data has been acquired, the above-described viewing pipeline processing is performed in step S26. By performing the viewing pipeline processing, the display objects (frame and pin) are created and overlapping displaying processing is performed in step S27. Thereafter, the processing step returns to step S21 and after a predetermined period of time, the processing steps after the above-described step S21 are repeatedly performed.

According to the present disclosure, during the procedure in three steps of moving to the shooting position, determining the facing direction of the image pickup apparatus, and determining the angle of view by zooming adjustment or the like to perform shooting, easy-to-understand guidance for anybody can be provided by a consistent user interface. The user of the image pickup apparatus can grasp the shooting point within the field of view by starting the image pickup apparatus and viewing the scenes through the image pickup apparatus, and, at the same time, intuitively grasp the meaning that it is only necessary to go to the shooting point. Further, since the frame representing the shooting composition is displayed three-dimensionally and facing which direction from the shooting directions allows the user to obtain a preferable shooting composition can be easily understood, even thought the user is weak in shooting photographs, the user can shoot preferably-composed photographs.

In the augmented reality technique according to the present disclosure described above, consistency of presence of the imaginary display object in space is important in providing the user of a sense (virtual reality) as if the imaginary object exists in the real space. In the present disclosure, it is important that the frame or the pin is consistently corresponding to the scenes with respect to the user operation on the image pickup apparatus.

In the case where an output of the direction detection has a delay in response, the movement of the display object causes a delay in response when the user changes the facing direction of the image pickup apparatus. Accordingly, it is recommended to use a high response direction detection method for the present function. Further, a built-in motor rotates to drive the lens when the user operates the zoom lever of the image pickup apparatus and during the period, the magnetic disturbance (disturbance) occurs due to driving by the motor. At this time, it is difficult for the direction detection method in the past to completely correct the disturbance as described above, fluctuation occurs in the output direction. If the disturbed direction is used for the AR display control, the display of the pin or the frame in the screen is displaced in response to the disturbance in the direction though the facing direction of the image pickup apparatus does not change. Accordingly, it is inconvenient for the user of the function because correspondence between the scenes and the display object is greatly disturbed.

The user can solve those problems when using the present disclosure. In the above-described examples, since the magnetic disturbance is predicted due to the user operation of the zoom lever, the direction can be output without any affection of the magnetic disturbance by switching the mode in the direction detection method to the integration direction priority mode immediately after the zoom lever operation. Further, the mode is switched to the integration direction priority mode by performing the similar processes for the magnetic disturbance caused by a charge and discharge of the strobe light or the like, and thereby the direction is output similarly.

Additionally, the present technology may also be configured as below.

(1) An electronic device including:
   a geomagnetism detection part acquiring magnetic direction data corresponding to geomagnetism every predetermined period of time;
   a change amount calculation part calculating a change amount of the magnetic direction data;
   a storage part storing the magnetic direction data;
   an angular velocity integration part calculating angle data obtained by integration of angular velocity obtained by an angular velocity detection part; and
   a direction output part
      employing, in the case where the magnetic direction data and the angular velocity are within a range of a threshold value, the magnetic direction data as output direction data,
      using, in the case where either one of the change amount or the angular velocity is outside the range of the threshold value, the angle calculated by the angular velocity integration part by setting a time point when exceeding the threshold value as a base point in time of zero, and
      employing, as an output direction, a value in which the angle is added to a latest geomagnetism data stored in the case where the change amount and the angular velocity are within the threshold value.

(2) The electronic device according to (1), including
   a disturbance detection part detecting as a disturbance a period of time during which a magnetic disturbance is occurring from immediately before an occurrence of a magnetic disturbance inside the device
   wherein, in the case where the magnetic disturbance is detected by the disturbance detection part, the direction output part employs as the output direction a value obtained by adding the angle calculated by the angular velocity integration part by setting a latest time point during a period the exchange amount and the angular velocity are within the threshold value as a base point in time to a geomagnetic vector at the base point in time.

(3) The electronic device according to (2), wherein the disturbance detection part detects a period of time during which the magnetic disturbance occurs from a control signal for controlling the device.

(4) An image pickup apparatus including:
   a position detection part acquiring position data of a current position;
   an angle detection part including a direction detection part acquiring direction data of a current shooting direction and an attitude detection part acquiring attitude data of a current shooting direction;
   a storage part storing reference position data indicating a shooting point with respect to a subject and reference shooting angle data at the shooting point;
   a display object creation part creating an imaginary object added to a real environment and changing as in a real environment in response to the position data and the angle data; and
   a display control part displaying the imaginary object on acquired image data in an overlapping manner on a display part, wherein
   the imaginary object includes a first display object whose display position changes in response to the current position data and a second display object with a shape changing based on the angle data;
   the direction detection part including
      a geomagnetism detection part acquiring magnetic direction data corresponding to geomagnetism every predetermined period of time,
      a change amount calculation part calculating a change amount of the magnetic direction data,
      a storage part storing the magnetic direction data,
      an angular velocity integration part calculating angle data obtained by integration of angular velocity obtained by an angular velocity detection part, and
      a direction output part
         employing, in the case where the magnetic direction data and the angular velocity are within a range of a threshold value, the magnetic direction data as output direction data,
         using, in the case where either one of the change amount or the angular velocity is outside the range of the threshold value, the angle calculated by the angular velocity integration part by setting a time point when exceeding the threshold value as a base point in time of zero, and
         employing, as an output direction, a value in which the angle is added to a latest geomagnetism data stored in the case where the change amount and the angular velocity are within the threshold value.

(5) The image pickup apparatus according to (4), including
a disturbance detection part detecting as a disturbance a period of time during which a magnetic disturbance is occurring from immediately before an occurrence of a magnetic disturbance inside the device
wherein, in the case where the magnetic disturbance is detected by the disturbance detection part, the direction output part employs as the output direction a value obtained by adding the angle calculated by the angular velocity integration part by setting a latest time point during a period the exchange amount and the angular velocity are within the threshold value as a base point in time to a geomagnetic vector at the base point in time.

(6) The image pickup apparatus according to (4), including
an angle of view detection part acquiring current angle of view data,
wherein the second display object changes in shape based on the angle data and the angle of view data.

(7) The image pickup apparatus according to (4), wherein the second display object is a display object obtained by converting a three-dimensional object to two-dimensional display on the display part.

(8) The image pickup apparatus according to (5), wherein the second display object is a frame.

(9) The image pickup apparatus according to (4), wherein the reference position data indicates a recommended point of shooting and the reference shooting angle data indicates a recommended angle of shooting.

(10) The image pickup apparatus according to (4), wherein a reduced image of an image shot in past times on the shooting point or semi-transmissive display is displayed on an acquired image in an overlapping manner.

"Modification"

Although the embodiments of the present disclosure have been specifically described above, the disclosure is not limited to the foregoing embodiments but various modifications based on the technical idea of the present disclosure are possible. For example, in the above-described embodiments, the pin representing the position and the frame are used as the display objects. However, other marks may be used as long as capable of guiding the shooting composition. For example, marks such as a cross mark and an x mark may be used. Further, the shooting target is not limited to a fixed landscape but a moving subject may be applicable.

Further, configuration, methods, processes, shapes, materials, numerical values and the like in the above-described embodiments may be combined insofar as they are not departing from the spirit of the present disclosure.

The present disclosure contains subject matter related to that disclosed in Japanese Priority Patent Application JP 2011-196386 filed in the Japan Patent Office on Sep. 8, 2011, the entire content of which is hereby incorporated by reference.

What is claimed is:

1. An electronic device comprising:
a geomagnetism detection unit acquiring magnetic direction data corresponding to geomagnetism every predetermined period of time;
a change amount calculation unit calculating a change amount of the magnetic direction data;
an angular velocity integration unit calculating angle data obtained by integration of angular velocity obtained by an angular velocity detection unit; and
a direction output unit configured to:
output the magnetic direction data when the magnetic direction data and the angular velocity are within a range of a threshold value;
output the angle data when one of the change amount or the angular velocity is outside the range of the threshold value; and
output a value in which the angle data is added to a latest geomagnetism data when the change amount and the angular velocity are within the threshold value and when a magnetic disturbance is detected within the electronic device.

2. The electronic device according to claim 1, further comprising a disturbance detection unit detecting as a disturbance, a period of time during which the magnetic disturbance is occurring from an occurrence of the magnetic disturbance inside the electronic device, wherein, when the magnetic disturbance is detected by the disturbance detection unit the direction output unit outputs a value obtained by adding the angle data calculated by setting a latest time point during a period when exchange amount and the angular velocity are within the threshold value as a base point in time to a geomagnetic vector at the base point in time.

3. The electronic device according to claim 2, wherein the disturbance detection unit detects a period of time during which the magnetic disturbance occurs from a control signal for controlling the electronic device.

4. An image pickup apparatus comprising:
a position detection unit acquiring position data of a current position;
an angle detection unit including comprising a direction detection unit acquiring direction data of a current shooting direction and an attitude detection unit acquiring attitude data of the current shooting direction;
a storage unit storing reference position data indicating a shooting point with respect to a subject and reference shooting angle data with respect to the shooting point;
a display object creation unit creating an imaginary object added to a real environment and changing the imaginary object in response to the position data and angle data; and
a display control unit displaying the imaginary object on acquired image data in an overlapping manner, wherein the imaginary object comprises a first display object whose display position changes in response to the current position and a second display object with a shape changing based on the angle data;
wherein the direction detection unit comprises:
a geomagnetism detection unit acquiring magnetic direction data corresponding to geomagnetism every predetermined period of time;
a change amount calculation unit calculating a change amount of the magnetic direction data;
an angular velocity integration unit calculating angle data obtained by integration of angular velocity obtained by an angular velocity detection unit; and
a direction output unit configured to:
output the magnetic direction data when the magnetic direction data and the angular velocity are within a range of a threshold value;
output the angle data calculated by the angular velocity integration unit when one of the change amount or the angular velocity is outside the range of the threshold value; and
output a value in which the angle data is added to a latest geomagnetism data when the change amount and the angular velocity are within the threshold value and when a magnetic disturbance is detected within the image pickup apparatus.

5. The image pickup apparatus according to claim 4, further comprising a disturbance detection unit detecting as a disturbance, a period of time during which the magnetic disturbance is occurring from an occurrence of the magnetic disturbance inside the image pickup apparatus wherein, when the magnetic disturbance is detected by the disturbance detection part, the direction output unit outputs a value obtained by adding the angle data calculated by setting a latest time point during a period when exchange amount and the angular velocity are within the threshold value as a base point in time to a geomagnetic vector at the base point in time.

6. The image pickup apparatus according to claim 4, comprising an angle of view detection unit acquiring current angle of view data, wherein the second display object changes in shape based on the angle data and the angle of view data.

7. The image pickup apparatus according to claim 4, wherein the second display object is a display object obtained by converting a three-dimensional object to two-dimensional display on a display unit.

8. The image pickup apparatus according to claim 4, wherein the second display object is a frame.

9. The image pickup apparatus according to claim 4, wherein the reference position data indicates a recommended point of shooting and the reference shooting angle data indicates a recommended angle of shooting.

10. The image pickup apparatus according to claim 4, wherein a reduced image of an image previously shot on the shooting point or semi-transmissive display is displayed on an acquired image in an overlapping manner.

11. An electronic device comprising:
a geomagnetism detection unit acquiring magnetic direction data corresponding to geomagnetism every predetermined period of time;
a change amount calculation unit calculating a change amount of the magnetic direction data;
a storage unit storing the magnetic direction data;
an angular velocity integration unit calculating angle data obtained by integration of angular velocity obtained by an angular velocity detection unit;
a disturbance detection unit detecting as a disturbance, a period of time during which a magnetic disturbance is occurring from immediately before an occurrence of the magnetic disturbance inside the electronic device; and
a direction output unit configured to:
output the magnetic direction data when the magnetic direction data and the angular velocity are within a range of a threshold value;
output the angle data calculated by the angular velocity integration unit by setting a time point when exceeding the threshold value as a base point in time of zero, when one of the change amount or the angular velocity is outside the range of the threshold value; and
output a value in which the angle data is added to a latest geomagnetism data stored when the change amount and the angular velocity are within the threshold value,
wherein, when the magnetic disturbance is detected by the disturbance detection unit, the direction output unit outputs another value obtained by adding the angle data calculated by the angular velocity integration unit by setting a latest time point during a period when exchange amount and the angular velocity are within the threshold value as the base point in time to a geomagnetic vector at the base point in time.

\* \* \* \* \*